United States Patent
Dhanda et al.

(10) Patent No.: US 8,953,515 B2
(45) Date of Patent: Feb. 10, 2015

(54) RECEIVING CELL BROADCAST (CB) MESSAGES

(71) Applicant: QUALCOMM Incorporated, San Diego, CA (US)

(72) Inventors: Mungal Singh Dhanda, Slough (GB); Nigel Phillip Robinson, Farnborough (GB); Ajit Gupta, Hyderabad (IN); Simon Walke, Basingstoke (GB); Bhanu Kiran Janga, Hyderabad (IN); Venkata Raji Reddy Kanthala, Hyderabad (IN); Subbarayudu Mutya, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/313,584

(22) Filed: Jun. 24, 2014

(65) Prior Publication Data

US 2014/0307613 A1   Oct. 16, 2014

Related U.S. Application Data

(62) Division of application No. 13/547,896, filed on Jul. 12, 2012, now Pat. No. 8,787,262.

(60) Provisional application No. 61/508,528, filed on Jul. 15, 2011, provisional application No. 61/599,205, filed on Feb. 15, 2012.

(51) Int. Cl.
  *H04W 4/00* (2009.01)
  *H04W 4/06* (2009.01)
  (Continued)

(52) U.S. Cl.
  CPC ............ *H04W 4/06* (2013.01); *H04W 48/08* (2013.01); *H04W 36/08* (2013.01); *H04W 88/06* (2013.01); *H04W 48/10* (2013.01)

USPC .......................................... 370/312; 370/331

(58) Field of Classification Search
  CPC .............................. H04W 4/06; H04W 36/08
  USPC ................................................... 370/312, 331
  See application file for complete search history.

(56) References Cited

U.S. PATENT DOCUMENTS

| 5,649,291 A | 7/1997 | Tayloe |
| 6,161,016 A | 12/2000 | Yarwood |

(Continued)

FOREIGN PATENT DOCUMENTS

| EP | 2493223 A1 | 8/2012 |
| GB | 2448933 A | 11/2008 |

(Continued)

OTHER PUBLICATIONS

3GPP TS 23.041. "Technical Specification Group Core Network and Terminals; Technical realization of Cell Broadcast Service (CBS)", version 8.0.0, Sep. 2008.

(Continued)

*Primary Examiner* — Farah Faroul
(74) *Attorney, Agent, or Firm* — QUALCOMM IP Department; James Hunt Yancey, Jr.

(57) ABSTRACT

A method for receiving cell broadcast messages is described. The method includes communicating with a first cell. The method also includes switching to communicating with a second cell. A cell broadcast channel is read after switching cells. The method further includes switching from a dedicated mode to a packet idle mode. The cell broadcast channel is reread once after switching from a dedicated mode to a packet idle mode. Other aspects, embodiments and features are also claimed and described.

12 Claims, 14 Drawing Sheets

(51) Int. Cl.
*H04W 48/10* (2009.01)
*H04H 20/71* (2008.01)
*H04W 48/08* (2009.01)
*H04W 36/08* (2009.01)
*H04W 88/06* (2009.01)

(56) References Cited

U.S. PATENT DOCUMENTS

| | | | |
|---|---|---|---|
| 6,438,117 B1 * | 8/2002 | Grilli et al. | 370/331 |
| 6,678,261 B1 | 1/2004 | Kim et al. | |
| 8,630,219 B2 | 1/2014 | Song et al. | |
| 2003/0050098 A1 | 3/2003 | D'Agati et al. | |
| 2009/0215473 A1 | 8/2009 | Hsu | |
| 2009/0274086 A1 * | 11/2009 | Petrovic et al. | 370/312 |
| 2010/0151813 A1 | 6/2010 | Faerber et al. | |
| 2011/0021216 A1 | 1/2011 | Pudney et al. | |
| 2011/0110520 A1 * | 5/2011 | Ness et al. | 380/270 |
| 2011/0235558 A1 | 9/2011 | Diachina et al. | |
| 2011/0275369 A1 | 11/2011 | Bartlett et al. | |
| 2011/0294532 A1 * | 12/2011 | Ambrosy et al. | 455/517 |
| 2012/0314610 A1 | 12/2012 | Hou | |
| 2013/0053091 A1 * | 2/2013 | Jorguseski et al. | 455/524 |
| 2013/0079017 A1 * | 3/2013 | Mach et al. | 455/441 |
| 2013/0176951 A1 | 7/2013 | Dhanda et al. | |
| 2013/0294364 A1 * | 11/2013 | Jul et al. | 370/329 |
| 2013/0295943 A1 | 11/2013 | Pasumarthi et al. | |
| 2013/0308781 A1 | 11/2013 | Kristiansson et al. | |
| 2014/0213261 A1 * | 7/2014 | Das et al. | 455/437 |
| 2014/0242992 A1 * | 8/2014 | Kennedy et al. | 455/436 |

FOREIGN PATENT DOCUMENTS

| | | | |
|---|---|---|---|
| JP | 2006339893 A | | 12/2006 |
| JP | 2010087579 A | | 4/2010 |
| KR | 20090089708 A | | 8/2009 |
| WO | WO-2005015782 A1 | | 2/2005 |
| WO | WO-2009042681 | | 4/2009 |
| WO | WO-2011047566 A1 | | 4/2011 |

OTHER PUBLICATIONS

3GPP TS 44.012 V8.0.0 (Dec. 2008). "3rd Generation Partnership Project; Technical Specification Group GSM EDGE Radio Access Network; Short Message Service Cell Broadcast (SMSCB) support on the mobile radio interface (Release 8)", Dec. 2008.

3GPP TS 45.002 V8.0.0 (Dec. 2008). "3rd Generation Partnership Project; Technical Specification Group GSM/EDGE Radio Access Network; Multiplexing and multiple access on the radio path (Release 8)", Dec. 2008, 105pgs.

"3rd Generation Partnership Project; Technical Specification Group GSM/EDGE Radio Access Network; Base Station Controller—Cell Broadcast Centre (BSC-CBC) interface specification; Cell Broadcast Service Protocol (CBSP) (Release 10)", 3GPP Standard; 3GPP TS 48.049, 3rd Generation Partnership Project (3GPP), Mobile Competence Centre ; 650, Route Des Lucioles ; F-06921 Sophia-Antipolis Cedex ; France, No. V10.0.0, Mar. 25, 2011, pp. 1-55, XP050476540, [retrieved on Mar. 25, 2011].

Axelsson, et al., "Support for cell broadcast as a global warning system", http://staffwww.itn.liu.se/~davgu/CB_thesis.pdf, Jun. 2007, 68 pgs.

Chapter II Demand and Articles 34 Amendments with Response to Written Opinion—PCT/US2012/043736—Jun. 25, 2013.

"Digital cellular telecommunications system (Phase 2+); Short Message Service Cell Broadcast (SMSCB) support on the mobile radio interface (3GPP TS 44.012 version 10.0.0 Release 10)", Technical Specification, European Telecommunications Standards Institute (ETSI), 650, Route Des Lucioles ; F-06921 Sophia-Antipolis; France, vol. 3GPP GERAN 2, No. V10.0.0, Apr. 1, 2011, XP014065418, p. 5, paragraph 2.1—p. 6 p. 8, paragraph 3.5—p. 9, paragraph 3.5.2.

International Preliminary Report on Patentability—PCT/US2012/046736, The International Bureau of WIPO—Geneva, Switzerland, Aug. 21, 2013.

International Search Report and Written Opinion—PCT/US2012/046736—ISA/EPO—Mar. 25, 2013.

Partial International Search Report—PCT/US2012/046736—ISA/EPO—Jan. 15, 2013.

Philips Semiconductors: "Extended BCCH and SMSCB radio conflict", 3GPP Draft; GP-020725, 3rd Generation Partnership Project (3GPP), Mobile Competence Centre ; 650, Route Des Lucioles ; F-06921 Sophia-Antipolis Cedex ; France, vol. TSG GERAN, no. Seattle; 20020410, Apr. 10, 2002, XP050005446, [retrieved on Apr. 10, 2002].

Siemens: "Introduction of MMBS", 3GPP Draft GP-050592_CR_43022_Introduction_MBMS_REV3, 3rd Generation Partnership Project (3GPP), Mobile Competence Centre ; 650, Route Des Lucioles ; F-06921 Sophia-Antipolis Cedex ; France, vol. TSG GERAN, no. Tampa; 20050127, Jan. 27, 2005, XP050013364, [retrieved on Jan. 27, 2005].

* cited by examiner

RECEIVING CELL BROADCAST (CB) MESSAGES

RELATED APPLICATIONS AND PRIORITY CLAIM

This application is a divisional of U.S. patent application Ser. No. 13/547,896, filed Jul. 12, 2012, for "RECEIVING CELL BROADCAST (CB) MESSAGES," which is related to and claims priority from U.S. Provisional Patent Application Ser. No. 61/508,528, filed Jul. 15, 2011, for "CELL BROADCAST FOR DUAL SIM DEVICES," and from U.S. Provisional Patent Application Ser. No. 61/599,205, filed Feb. 15, 2012, for "PREDICTIVE DRX MODE FOR EFFICIENT RECEPTION OF THE CELL-BROADCAST SERVICE (CBS)," which are incorporated herein by reference.

TECHNICAL FIELD

Embodiments of the present invention discussed in this application relate generally to wireless communication systems. More specifically, embodiments of the present invention discussed in this application relate to systems and methods for receiving cell broadcast (CB) messages.

BACKGROUND

Wireless communication systems are widely deployed to provide various types of communication content such as voice, video, data and so on. These systems may be multiple-access systems capable of supporting simultaneous communication of multiple mobile devices with one or more base stations.

Mobile devices are typically battery operated. It is desirable to maximize the battery life of mobile devices. One way to maximize battery life is to shut off components within the mobile device during periods when those components are not needed/used. By shutting off these components, battery power is conserved without reducing the overall user experience of the mobile device. One example of a component that may be shut off is a receiver.

When the mobile device is receiving Short Message Service (SMS) messages using the cell-broadcast service (CBS), the mobile device is typically on for the entire duration of the CBS to ensure that a desired cell-broadcast (CB) message is not missed. In some configurations, a network may support a mode where the base station informs a mobile device of the scheduling of the cell-broadcast (CB) messages (referred to as CB discontinuous reception (CB-DRX)). See 3GPP TS 23.041, "Technical realization of Cell Broadcast Service," and 3GPP TS 44.012, "Short Message Service Cell Broadcast (SMSCB) support on the mobile radio interface." However, many networks do not support CB-DRX. By reducing the power consumption of mobile devices while receiving CB messages in networks that do not support CB-DRX, benefits may be realized.

As wireless communication systems have become more widely deployed, the number of radio access technologies (RATs) available has also increased. To increase the feasibility and mobility of a mobile device, the mobile device may be capable of communicating with more than one radio access technology (RAT). Benefits may be realized by improved methods for receiving cell broadcast (CB) messages while communicating with more than one radio access technology (RAT).

SUMMARY OF SOME EXAMPLE EMBODIMENTS

A method for receiving cell broadcast messages is described. The method includes communicating with a first cell. The method also includes switching to communicating with a second cell. After switching cells, a cell broadcast channel is read. The method further includes switching from a dedicated mode to a packet idle mode. The cell broadcast channel is reread once after switching from a dedicated mode to a packet idle mode.

The method may be performed by a wireless communication device. The wireless communication device may use one or more subscriber identification module cards. Cell broadcast scheduling message may not be supported by the second cell. Reading a cell broadcast channel may include searching the cell broadcast channel for a cell broadcast message.

An apparatus for receiving cell broadcast messages is also described. The apparatus includes a processor, memory in electronic communication with the processor and instructions stored in the memory. The instructions are executable by the processor to communicate with a first cell. The instructions are also executable by the processor to switch to communicating with a second cell. The instructions are further executable by the processor to read a cell broadcast channel after switching cells. The instructions are also executable by the processor to switch from a dedicated mode to a packet idle mode. The instructions are further executable by the processor to reread the cell broadcast channel once after switching from a dedicated mode to a packet idle mode.

A method for receiving cell broadcast messages is described. A trigger to read a cell broadcast channel is received. It is determined that a network does not support cell broadcast scheduling messages. A rate at which the cell broadcast channel is read is reduced. The cell broadcast channel is read at the reduced rate.

The method may be performed by a wireless communication device. Reducing the rate at which the cell broadcast channel is read may include using pseudo scheduling information. The pseudo scheduling information may give a cell broadcast channel higher priority than a paging channel. The pseudo scheduling information may be such that the wireless communication device reads all cell broadcast message slots until a schedule map has expired.

It may be determined that all the desired messages have been read. The method may include discontinuing rereading the cell broadcast channel at the reduced rate.

An apparatus for receiving cell broadcast messages is also described. The apparatus includes a processor, memory in electronic communication with the processor and instructions stored in the memory. The instructions are executable to receive a trigger to read a cell broadcast channel. The instructions are also executable to determine that a network does not support cell broadcast scheduling messages. The instructions are further executable to reduce a rate at which the cell broadcast channel is read. The instructions are also executable to reread the cell broadcast channel at the reduced rate.

A method for receiving cell broadcast messages is described. A cell broadcast channel is monitored. Slots where a desired message is expected in the cell broadcast channel are calculated. The cell broadcast channel is read only at the calculated slots.

The method may be performed by a wireless communication device. The cell broadcast channel may be monitored for a continuous scan time to obtain a number of repetitions, a periodicity, and a last slot number. The repetitions, the periodicity, and the last slot number may be used to calculate slots where a desired message is expected. A cell broadcast continuous scan procedure may be performed if predictive scheduling has failed for any desired message.

Reading the cell broadcast channel only at the calculated slots may be part of a cell broadcast predictive scan procedure. A cell broadcast continuous scan procedure may be performed if a refresh timer expires during the cell broadcast predictive scan procedure. The method may be performed in a network that does not support a cell broadcast scheduling mechanism.

Monitoring a cell broadcast channel may include starting a continuous scan timer. Monitoring a cell broadcast channel may also include reading all cell broadcast message slots. Monitoring a cell broadcast channel may further include determining whether a message ID and an update number have changed since a previous cell broadcast channel slot.

If at least one of the message ID and update number have changed since the previous cell broadcast message slot, the number of repetitions for the message ID may be incremented. When the continuous scan timer expires, the message ID, a cell ID, the number of repetitions, a last message slot number, and calculated periodicity may be stored. The message ID, the cell ID, the number of repetitions, the last message slot number, and the calculated periodicity may be used to calculate slots where a desired message is expected.

An apparatus for receiving cell broadcast messages is described. The apparatus includes a processor, memory in electronic communication with the processor and instructions stored in the memory. The instructions are executable by the processor to monitor a cell broadcast channel. The instructions are also executable by the processor to calculate message slots where a desired message is expected in the cell broadcast channel. The instructions are further executable by the processor to read the cell broadcast channel only at the calculated message slots.

An apparatus configured for receiving cell broadcast messages is described. The apparatus includes means for communicating with a first cell. The apparatus also includes means for switching to communicating with a second cell. The apparatus further includes means for reading a cell broadcast channel after switching cells. The apparatus also includes means for switching from a dedicated mode to a packet idle mode. The apparatus further includes means for rereading the cell broadcast channel once after switching from a dedicated mode to a packet idle mode.

A computer-program product for a receiving cell broadcast messages is also described. The computer-program product includes a non-transitory computer-readable medium having instructions thereon. The instructions include code for causing a wireless device to communicate with a first cell. The instructions also include code for causing the wireless device to switch to communicating with a second cell. The instructions further include code for causing the wireless device to read a cell broadcast channel after switching cells. The instructions also include code for causing the wireless device to switch from a dedicated mode to a packet idle mode. The instructions further include code for causing the wireless device to reread the cell broadcast channel once after switching from a dedicated mode to a packet idle mode.

An apparatus configured for receiving cell broadcast messages is described. The apparatus includes means for monitoring a cell broadcast channel. The apparatus also includes means for calculating slots where a desired message is expected in the cell broadcast channel. The apparatus further includes means for reading the cell broadcast channel only at the calculated slots.

A computer-program product for a receiving cell broadcast messages is also described. The computer-program product includes a non-transitory computer-readable medium having instructions thereon. The instructions include code for causing a wireless device to monitor a cell broadcast channel. The instructions also include code for causing the wireless device to calculate message slots where a desired message is expected in the cell broadcast channel. The instructions further include code for causing the wireless device to read the cell broadcast channel only at the calculated message slots.

A wireless device configured for receiving cell broadcast messages is described. The wireless device includes means for monitoring a cell broadcast channel. The wireless device also includes means for calculating message slots where a desired message is expected in the cell broadcast channel. The wireless device further includes means for reading the cell broadcast channel only at the calculated message slots.

A computer-program product for a receiving cell broadcast messages is also described. The computer-program product includes a non-transitory computer-readable medium having instructions thereon. The instructions include code for causing a wireless device to monitor a cell broadcast channel. The instructions also include code for causing the wireless device to calculate message slots where a desired message is expected in the cell broadcast channel. The instructions further include code for causing the wireless device to read the cell broadcast channel only at the calculated message slots.

Other aspects, features and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments, it should be understood that such exemplary embodiments can be implemented in various devices, systems, and methods.

DETAILED DESCRIPTION OF ALTERNATIVE & EXEMPLARY EMBODIMENTS

Figure 1:
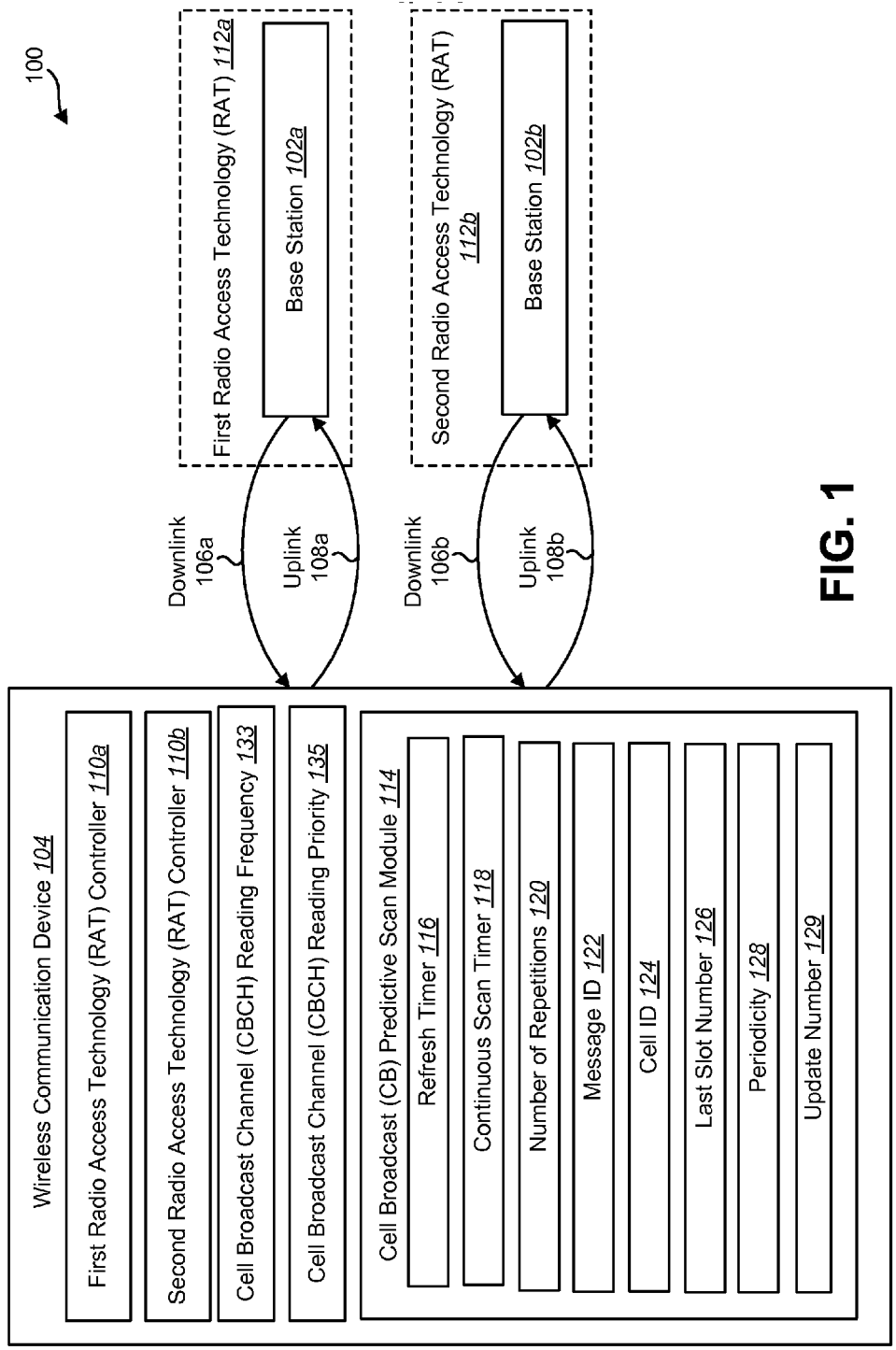
FIG. 1 shows a wireless communication system with multiple wireless devices according to some embodiments of the present invention.

FIG. 1 shows a wireless communication system 100 with multiple wireless devices. Wireless communication systems 100 are widely deployed to provide various types of communication content such as voice, data, and so on. A wireless device may be a base station 102 or a wireless communication device 104.

A base station 102 can communicate with one or more wireless communication devices 104. A base station 102 may also be referred to as and may include some or all of the functionality of, an access point, a broadcast transmitter, a NodeB, an evolved NodeB, etc. The term "base station" will be used herein. Each base station 102 provides communication coverage for a particular geographic area. A base station 102 may provide communication coverage for one or more wireless communication devices 104. The term "cell" can refer to a base station 102 and/or its coverage area, depending on the context in which the term is used.

Communications in a wireless communication system 100 (e.g., a multiple-access system) may be achieved through transmissions over a wireless link. Such a communication link may be established via a single-input and single-output (SISO), multiple-input and single-output (MISO), or a multiple-input and multiple-output (MIMO) system. A MIMO system includes transmitter(s) and receiver(s) equipped, respectively, with multiple ($N_T$) transmit antennas and multiple ($N_R$) receive antennas for data transmission. SISO and MISO systems are particular instances of a MIMO system. The MIMO system can provide improved performance (e.g., higher throughput, greater capacity or improved reliability) if the additional dimensionalities created by the multiple transmit and receive antennas are utilized.

The wireless communication system 100 may utilize MIMO. A MIMO system may support both time division duplex (TDD) and frequency division duplex (FDD) systems. In a TDD system, uplink and downlink transmissions are on the same frequency region so that the reciprocity principle allows the estimation of the downlink channel from the uplink channel. This enables a transmitting wireless device to extract transmit beamforming gain from communications received by the transmitting wireless device.

The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems, and spatial division multiple access (SDMA) systems.

The terms "networks" and "systems" are often used interchangeably. A CDMA network may implement a radio technology such as Universal Terrestrial Radio Access (UTRA), cdma2000, etc. UTRA includes W-CDMA and Low Chip Rate (LCR) while cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDMA, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and Long Term Evolution (LTE) are described in documents from an organization named "3rd Generation Partnership Project" (3GPP). cdma2000 is described in documents from an organization named "3rd Generation Partnership Project 2" (3GPP2).

A wireless communication device 104 may also be referred to as and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, etc.

A wireless communication device 104 may communicate with zero, one, or multiple base stations 102 on the downlink 106a-b and/or uplink 108a-b at any given moment. The downlink 106 (or forward link) refers to the communication link from a base station 102 to a wireless communication device 104, and the uplink 108 (or reverse link) refers to the communication link from a wireless communication device 104 to a base station 102.

In embodiments of the present invention, a wireless communication device 104 may be capable of communicating with a first base station 102a as part of a first radio access technology (RAT) 112a and a second base station 102b as part of a second radio access technology (RAT) 112b. Examples of radio access technologies (RATs) 112 include Global System for Mobile Communications (GSM), 1x (also known as cdma2000 1x), high data rate (HDR), W-CDMA, and Long Term Evolution (LTE). The wireless communication device 104 may use dual SIM dual standby (DSDS) to communicate with two radio access technologies (RATs) 112. In dual SIM dual standby (DSDS), a wireless communication device 104 has two subscriber identification module (SIM) cards. However, the wireless communication device 104 is not required to use SIM cards. Thus, a wireless communication device 104 that uses dual SIM dual standby (DSDS) may be any wireless communication device 104 that is capable of communicating using more than one radio access technology (RAT) 112. Dual SIM dual standby (DSDS) is a popular feature in China, India, South East Asia, Latin America, and other markets.

The wireless communication device 104 may communicate with different combinations of radio access technologies (RATs) 112. For example, a wireless communication device 104 may be capable of communicating with both a Global System for Mobile Communications (GSM) radio access technology (RAT) 112 and a 1x radio access technology (RAT) 112; a Global System for Mobile Communications (GSM) radio access technology (RAT) 112 and a high data rate (HDR) radio access technology (RAT) 112; or a 1x radio access technology (RAT) 112 and a high data rate (HDR) radio access technology (RAT) 112.

To be competitive in markets utilizing dual SIM dual standby (DSDS), a wireless communication device 104 may need to have optimal power consumption and lower hardware cost. For example, a wireless communication device 104 that has higher power consumption and a dual receiver may be unable to compete in a dual SIM dual standby (DSDS) market. Thus, reducing hardware cost and power consumption of a dual SIM dual standby (DSDS) wireless communication device 104 is desirable.

When a wireless communication device 104 is reading the cell broadcast channel (CBCH) and the paging channel (PCH) while in dual SIM mode, a higher rate of collisions may occur due to the shorter paging schedule. This higher rate of collisions may lead to, in one implementation, an increase in the number of cell broadcast (CB) messages that are missed by the wireless communication device 104. Cell broadcast (CB) messages may also be referred to as cell broadcast short message service (CB-SMS) messages). In another implementation, the higher rate of collisions may lead to an increase in the number of paging channel (PCH) messages that are missed by the wireless communication device 104. Thus, increasing the ability of the wireless communication device 104 to minimize the number of cell broadcast (CB) messages that are missed or dropped is highly desirable.

To optimize reception of cell broadcast (CB) messages, a wireless communication device 104 may reduce the cell broadcast channel (CBCH) reading frequency 133. This may be done by a cell broadcast (CB) task in the wireless communication device 104. The cell broadcast (CB) task in the wireless communication device 104 may know how many pages are included in a cell broadcast (CB) message. The cell broadcast (CB) task can use a pseudo scheduling approach if a network does not use cell broadcast scheduling.

The wireless communication device 104 may also raise the priority 135 for a cell broadcast channel (CBCH) read if the cell broadcast channel (CBCH) collides with the paging channel (PCH). The GERAN logical layer (L1) in the wireless communication device 104 may be the best place to do this. In a dual SIM wireless communication device 104, activity that requires the use of the radio (e.g., read the broadcast control channel (BCCH), read the paging channel (PCH), a voice call, a data call) is given a priority 135. When two radio access technology (RAT) controllers 110a-b require the use of the radio at the same time, the priority 135 may be used to determine which radio access technology (RAT) controller 110a-b gets to use the radio. Normally, reading the paging channel (PCH) gets higher priority but with pseudo scheduling, the cell broadcast channel (CBCH) is given a higher priority, since cell broadcast channel (CBCH) reading is done at a much lower rate (i.e., once every 30 seconds), while paging channel (PCH) reading happens much more frequently. Combining the use of a raised priority 135 for cell broadcast channel (CBCH) reading and reducing the cell broadcast channel (CBCH) reading frequency 133 may minimize the number of missed paging channel (PCH) blocks while also minimizing additional power consumption due to the reading of the cell broadcast channel (CBCH).

In one configuration, the wireless communication device 104 may perform cell broadcast channel (CBCH) reading only upon first camping on a cell. This can reduce the number of missed paging channel (PCH) blocks while also minimizing power consumption due to the reading of the cell broadcast channel (CBCH). This may be a configurable option, since it may not suitable for all markets or other network environments.

If the wireless communication network 100 supports the use of the cell broadcast channel (CBCH), the base station 102 may broadcast a cell broadcast (CB) page every 1.88 seconds (8*51 multiframes) on the cell broadcast channel (CBCH). If a wireless communication device 104 supports simultaneous standby for two or more subscriptions, there may be a high probability that a collision occurs between a cell broadcast (CB) reception by one subscription and the page read of another subscription. Thus, there is a tradeoff between paging channel (PCH) reads and cell broadcast channel (CBCH) reads. For a subscription whose paging channel (PCH) read is missed, the subscription may go out of service due to the collisions. There is also a possibility that no reading of the cell broadcast channel (CBCH) may occur if two subscriptions camp on the same network.

In embodiments of the present invention, the wireless communication network 100 may support discontinuous reception (DRX) of cell broadcast (CB) messages. In cell broadcast (CB) discontinuous reception (CB-DRX), the base station 102 may signal to the wireless communication device 104 which cell broadcast (CB) message will be broadcast and when by broadcasting a cell broadcast (CB) schedule message. CB-DRX thus allows the wireless communication device 104 to power down a receiver on the wireless communication device 104 during periods when the base station 102 is not broadcasting a cell broadcast (CB) message that is desired by the wireless communication device 104. However, many networks do not support CB-DRX mode. If a network does not support CB-DRX mode, the wireless communication device 104 may have to decode every cell broadcast channel (CBCH) slot at a rate of 8*51 multiframes to obtain the desired message, resulting in increased power consumption by the wireless communication device 104.

To reduce the power consumption by a wireless communication device 104 in a network that does not support CB-DRX mode, the wireless communication device 104 may include a cell broadcast (CB) predictive scan module 114. The cell broadcast (CB) predictive scan module 114 may allow the wireless communication device 104 to predict when the base station 102 is likely to broadcast a desired message, thereby allowing the wireless communication device 104 to power down during periods when the desired message is not broadcast, thereby conserving battery power. Use of the cell broadcast (CB) predictive scan module 114 also minimizes collisions between page reception and cell broadcast (CB) reception in multi-subscription wireless communication devices 104.

The cell broadcast (CB) predictive scan module 114 may include a refresh timer 116. When the cell broadcast (CB) predictive scan module enters a predictive CB-DRX mode, the wireless communication device 104 may start the refresh timer 116. When the refresh timer 116 expires, the wireless communication device 104 may exit predictive CB-DRX mode to refresh the settings for the cell broadcast (CB) predictive scan module 114. Periodically refreshing the settings for the cell broadcast (CB) predictive scan module 114 may reduce the possibility of missed desired messages when the base station 102 changes the pattern of broadcasting the desired messages.

The cell broadcast (CB) predictive scan module 114 may also include a continuous scan timer 118. Prior to entering predictive CB-DRX mode, the wireless communication device 104 may perform a continuous scan of the cell broadcast (CB) messages to determine which cell broadcast (CB) messages are broadcast by the network and how these cell broadcast (CB) messages are repeated. During the continuous scan, the wireless communication device 104 may determine the number of repetitions 120 for a desired message, the message ID 122, the cell ID 124, and the periodicity 128. The continuous scan may be performed until the continuous scan timer 118 expires. Once the continuous scan timer 118 expires, the cell broadcast (CB) predictive scan module 114 may also determine the last slot number 126 the desired message or messages were received in. During the continuous scan, whenever the cell broadcast (CB) predictive scan module 114 detects a new message ID 122, the respective count parameter may be incremented. There may be one counter for each message ID 122 to count how many times the message ID 122 has been repeated and in which cell broadcast (CB) slots the message corresponding to the message ID 122 was sent in. The continuous scan may occur over a window of duration MxN slots, where M is the number of messages that will have different message IDs 122 and N is multiples of 49 slots. A value of 49 has been selected for N because this is the maximum duration of schedule information provided by the network if the network supports CB-DRX mode. As an example, if the number of messages which will have different message IDs 122 is 3 (i.e., three different desired messages are watched by the cell broadcast (CB) predictive scan module 114) and a multiple of 3*49 slots is used, the number of slots for the continuous scan timer 118 may be 3*3*49=441. In other words, 441 continuous slots may be examined during continuous scan mode.

The cell broadcast (CB) predictive scan module 114 may determine the number of consecutive repetitions 120 of the same message ID 122. The number of repetitions 120, the message ID 122, the cell ID 124, the periodicity 128, and the last slot number 126 may be settings for a predictive CB-DRX mode scan procedure in embodiments of the present invention. Thus, the cell broadcast (CB) predictive scan module 114 may use the number of repetitions 120, the message ID 122, the cell ID 124, the periodicity 128, and the last slot number 126 to predict when the base station 102 is likely to broadcast a desired message. In other words, when in predictive CB-DRX mode, the wireless communication device 104 may only read the slots where a desired message is predicted to be broadcast.

The cell broadcast (CB) predictive scan module 114 may predict the valid data message slots and adapt the wireless communication device 104 to read the cell broadcast channel (CBCH) during those valid data message slots. The adaptive approach may fall onto an integer multiple of an 8*51-multiframe. The cell broadcast (CB) predictive scan module 114 may reduce the power consumption of the wireless communication device 104 significantly as the wireless communication device 104 tracks the cell broadcast (CB) messages broadcast by the network. Recent studies have indicated that cell broadcast (CB) messages do not change frequently (e.g., the message ID 122 and update number 129 are fairly constant).

Every cell broadcast (CB) message is given a message sequence number. A combination of the message ID 122 and the message sequence number makes each message unique. If the message sequence number has changed, that means that the message contents have changed and the wireless communication device 104 should reread this message. The update number 129 is a part of the serial number. The update number 129 may be incremented by the network if an old message needs to be updated. The wireless communication device 104 may replace the old message with the new message in such cases.

The use of the cell broadcast (CB) predictive scan module 114 may reduce the probability of collisions in multi-SIM devices when one subscription reads the cell broadcast channel (CBCH) and another subscription reads the paging channel (PCH). However, if the network updates the cell broadcast (CB) messages frequently, very little power savings may be achieved. Furthermore, if the periodicity 128 is not constant, very little power savings may be achieved. In this case, the cell broadcast (CB) predictive scan module 114 may return to continuous scan mode frequently. Nevertheless, any use of a predictive CB-DRX mode scan procedure may provide a reduction in power consumption compared to non-DRX mode.

Figure 2:
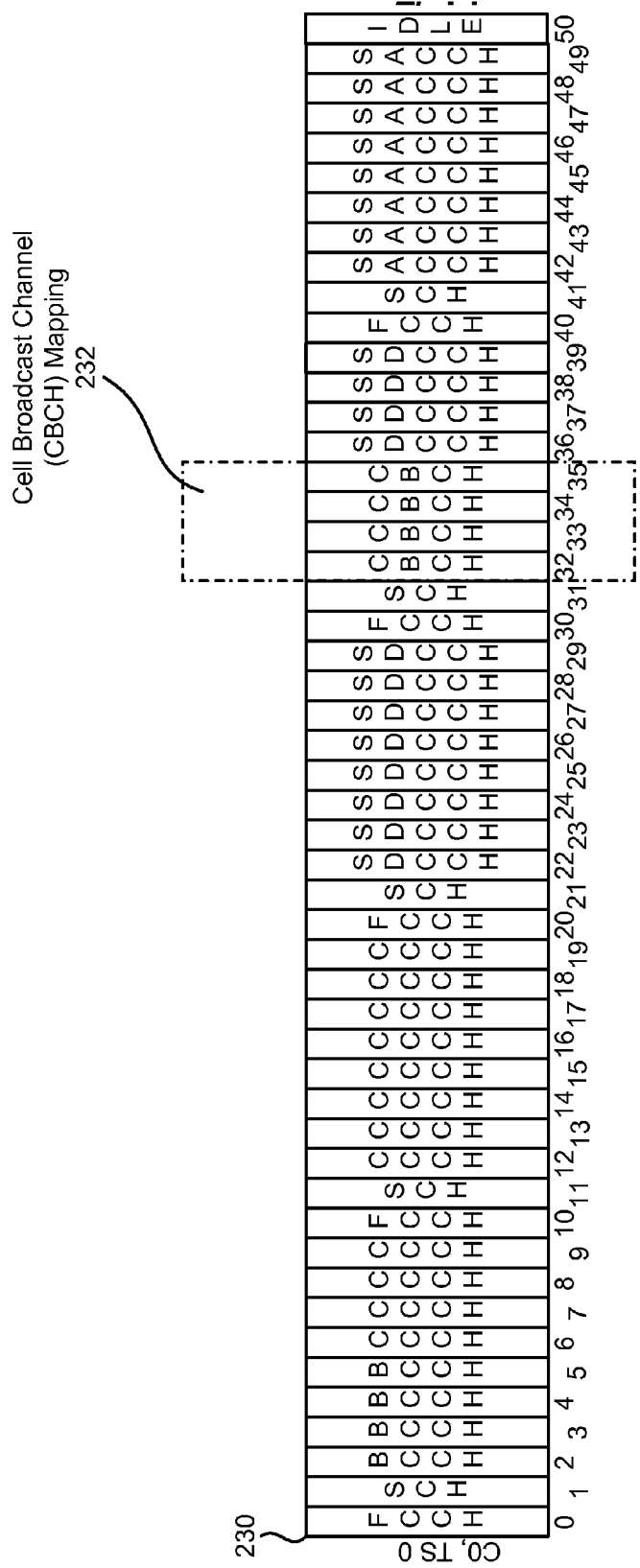
FIG. 2 is a block diagram illustrating cell broadcast channel (CBCH) mapping to SDCCH/4 according to some embodiments of the present invention.

FIG. 2 is a block diagram illustrating cell broadcast channel (CBCH) mapping 232 to SDCCH/4. There are two cell broadcast channels (CBCH) defined in the specification: the cell broadcast channel (CBCH) basic and the cell broadcast channel (CBCH) extended. Both the cell broadcast channel (CBCH) basic and the cell broadcast channel (CBCH) extended occupy the same frames within a 51-multiframe 230. However, the cell broadcast channel (CBCH) basic uses 51-multiframes 230 with TC=0, 1, 2 and 3 while the cell broadcast channel (CBCH) extended uses 51-multiframes 230 with TC=4, 5, 6 and 7.

TC is a modulo 8 counter that counts the number of 51-multiframes 230. TC=mod(int(FN/51), 8), where FN is the Frame Number. For example, TC=0 for frame numbers 0-50, TC=1 for frame numbers 51-101, TC=2 for frame numbers 102-152, TC=3 for frame numbers 153-203, TC=4 for frame numbers 204-254, TC=5 for frame numbers 255-305, TC=6 for frame numbers 306-356 and TC=7 for frame numbers 357-407. Then it repeats; thus TC=0 for frame numbers 408-458. One TC cycle thus has 408 frames. Each cell broadcast (CB) message may be sent over one or more TC cycles.

All wireless communication devices 104 are expected to read the cell broadcast channel (CBCH) basic (this is mandatory for GSM capable devices). However, the reading of the cell broadcast channel (CBCH) extended is optional. Both the cell broadcast channel (CBCH) basic and the cell broadcast channel (CBCH) extended are optional for the network. If the network supports the cell broadcast channel (CBCH), the network may generally support cell broadcast channel (CBCH) basic because wireless communication devices 104 are only mandated to support this channel. The network may optionally also support cell broadcast channel (CBCH) extended but the network cannot rely on wireless communication devices 104 to read the cell broadcast channel (CBCH) extended.

The two cell broadcast channels (CBCHs) are considered as parallel channels. The network must broadcast a complete cell broadcast (CB) message on one cell broadcast channel (CBCH). The network cannot send part of a cell broadcast (CB) message on one cell broadcast channel (CBCH) and part of the cell broadcast (CB) message on another cell broadcast channel (CBCH). The network may repeat the same message on both cell broadcast channels (CBCHs) or send different messages on each cell broadcast channel (CBCH).

A cell broadcast channel (CBCH) may be mapped to a physical channel using two possible formats: SDCCH/8 and SDCCH/4, where SDCCH refers to the stand-alone dedicated control channel. SDCCH/8 is discussed in additional detail below in relation to FIG. 3. The SDCCH/4 mapping format may be used when the network deploys a combined common control channel (CCCH)+SDCCH. The SDCCH/8 mapping format is used with a non-combined common control channel (CCCH).

When the cell broadcast channel (CBCH) is mapped to SDCCH/4, the network is using combined CCCH+SDCCH in a cell. Hence, the cell broadcast channel (CBCH) uses the same frequency and timeslot as the broadcast control channel (BCCH). In this case, the cell broadcast channel (CBCH) does not collide with the broadcast control channel (BCCH) or the paging channel (PCH) blocks. The use of SDCCH/4 mapping is most likely to be used in rural or sparsely populated areas, as there are only up to three paging opportunities within one 51-multiframe 230. This is because half of the 51-multiframes 230 are used for dedicated connections signaling purposes only and not speech. Signaling connections are needed for registration, periodic updates, short message service (SMS), etc. The cell broadcast channel (CBCH) is thus mapped to multiframes 32, 33, 34 and 35 within a 51-multiframe 230. This is fixed by the specification.

Figure 3:
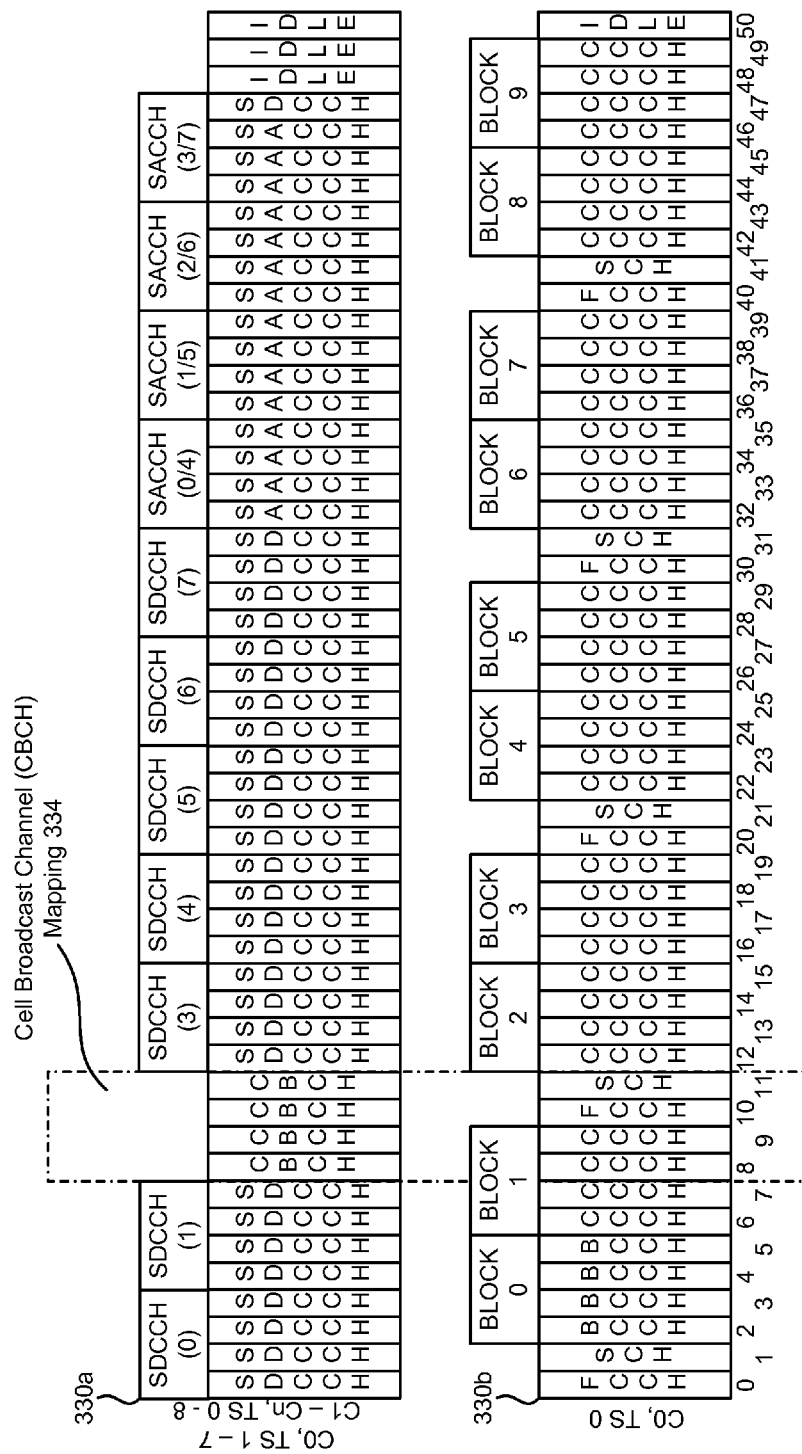
FIG. 3 is a block diagram illustrating cell broadcast channel (CBCH) mapping to SDCCH/8 according to some embodiments of the present invention.

FIG. 3 is a block diagram illustrating cell broadcast channel (CBCH) mapping to SDCCH/8. In this case, the cell broadcast channel (CBCH) is mapped to a different physical channel than the broadcast control channel (BCCH) or the common control channel (CCCH). The specification allows the cell broadcast channel (CBCH) to be mapped to any frequency, but it is far more optimal to map the cell broadcast channel (CBCH) to a physical channel on the broadcast control channel (BCCH) carrier but using a different timeslot.

There are two different 51-multiframes 330a-b shown in FIG. 3. One multiframe 330a is dedicated for all common control channels (broadcast control channel (BCCH), paging channel (PCH), access grant channel (AGCH), random access channel (RACH), etc., except the cell broadcast channel (CBCH)). The broadcast control channel (BCCH) is always on timeslot 0, while the paging channel (PCH), access grant channel (AGCH) and random access channel (RACH) can be on timeslot 0 or both 0 and 2 or 0, 2 and 4 or 0, 2, 4 and 6. The other 51-multiframe 330b has four radio frames on one timeslot only set aside for the cell broadcast channel (CBCH).

Figure 4:
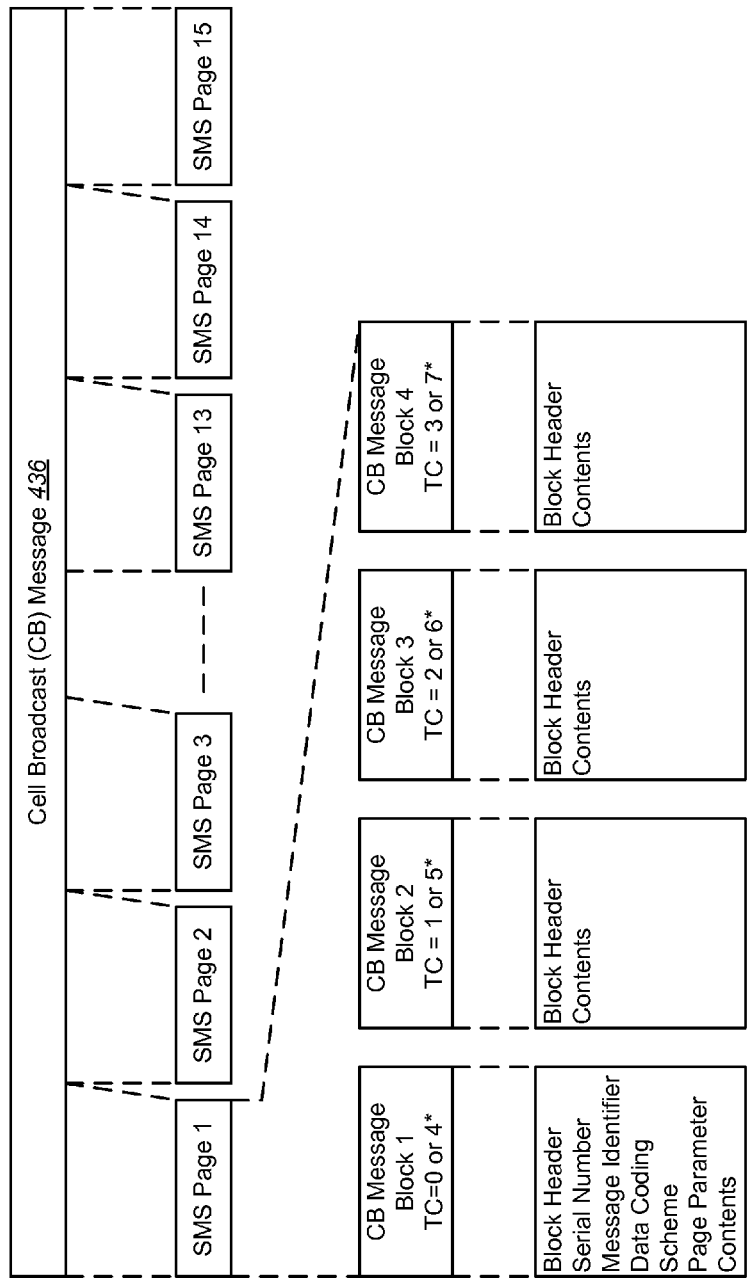
FIG. 4 is a block diagram illustrating the structure of a cell broadcast (CB) message according to some embodiments of the present invention.

FIG. 4 is a block diagram illustrating the structure of a cell broadcast (CB) message 436. As discussed above, a cell broadcast (CB) message 436 may also be referred to as a cell broadcast short message service (CB-SMS) message. Each cell broadcast (CB) message 436 may be up to 1230 octets long. The cell broadcast (CB) message 436 may be split into up to 15 pages, each page having a maximum size of 82 octets of user data. Each page of the cell broadcast (CB) message 436 may then be sent in four consecutive radio blocks on the cell broadcast channel (CBCH).

Each page of the cell broadcast (CB) message 436 includes a page header. The page header includes a serial number, a message identifier, a data coding scheme, the total number of pages and the page number followed by a cell broadcast (CB) short message service (SMS) segment. Each page may be split up into up to four radio blocks and each radio block includes the block header (which indicates the block number and whether it is the last block of the page). Because the first radio block always includes the page header, it is necessary for the wireless communication device 104 to read this block to determine if the remaining three radio blocks should be read or not.

The ability to read the cell broadcast channel (CBCH) for one subscription while maintaining sufficient paging reception performance on the other subscription may depend on the network configuration. Cell broadcast (CB) reception may be obtained for G+G and G+W configurations. It may be assumed that the relative alignment of the two GERAN cells (i.e., the cell of the first subscription and the cell of the second subscription) does not change significantly over time. The possibility of a collision of the paging channel (PCH) for one subscription and the cell broadcast channel (CBCH) for the other subscription may depend on the alignment of the two 51-multiframes 330 and the paging multiframe. A shorter paging discontinuous reception (DRX) cycle equals a high collision probability. The probability of a paging channel (PCH) collision with a cell broadcast channel (CBCH) depends on device architecture but can be on the order of 20%.

A collision of a paging channel (PCH) read with a cell broadcast channel (CBCH) read may be a persistent occurrence or an intermittent occurrence, depending on the paging cycle used in the cell. Table 1 below lists whether a collision will occur for different paging cycles used in a cell. A collision is considered to have occurred when all four consecutive cell broadcast (CB) message 436 blocks (also referred to as a cell broadcast (CB) message slot) can not be read. Therefore, a collision will happen when the number of 51-multiframes 330 between two consecutive monitored paging multiframes is less than five.

TABLE 1

| Paging cycle | Collision |
| --- | --- |
| 2 | Yes |
| 3 | Yes |
| 4 | Yes |
| 5 | No |
| 6 | No |
| 7 | No |
| 8 | No |
| 9 | No |

For cases where the cell broadcast channel (CBCH) reading collides with the paging channel (PCH) reading (and thus the cell broadcast channel (CBCH) could not be read), some work-around mechanism may be necessary. One workaround mechanism is to skip the paging channel (PCH) reading and allow the cell broadcast channel (CBCH) reading to take place. The drawback of this approach is that it could lead to missed mobile-terminated calls. For some situations, this may be the only option. The paging reception performance may be improved by lowering the rate at which the cell broadcast channel (CBCH) refresh is performed. This is discussed in additional detail below in relation to FIG. 7 and FIG. 8.

Another workaround mechanism is to read different blocks of the cell broadcast page during different TC cycles, when possible. The disadvantage of this approach is that if the network modifies the cell broadcast (CB) message 436, the wireless communication device 104 may end up combining user text from different instances of a message or from different messages (even worse). Therefore, this workaround is not suitable for markets where cell broadcast (CB) messages 436 are likely to change (and is thus not suitable for the present systems and methods).

Table 2 below illustrates the number of consecutive paging blocks that may be missed for different paging cycles.

TABLE 2

| Paging cycle | Number of consecutive paging blocks missed | Comments |
|---|---|---|
| 2 | 2 | With this paging cycle, two of the four blocks will always collide with CBCH reads. There is a 50% chance that paging will persistently collide with the reading of TC = 0. In this case, the priority of CBCH may be raised to read the block at TC = 0. If the remaining three blocks also need to be read, the priority of CBCH may again be raised. |
| 3 | 1 | In this case, paging read will not persistently collide with TC = 0. Therefore, it is not necessary to raise the priority of a CBCH read. But a paging read will collide with one of the four message blocks. Although over two TC cycles it is possible to read all the CBCH blocks, it can lead to a garbled message. For this reason, it is advised to raise the priority of a CBCH read. |
| 4 | 1 | This case is similar to the case of paging cycle 2 in that one message block will persistently collide with the CBCH read. Therefore, the best approach is to raise the priority of CBCH reading over paging reading. |

If a wireless communication device 104 does not have any knowledge of what and when the network is broadcasting, the wireless communication device 104 may have to read at least every cell broadcast channel (CBCH) block at TC=0. This equates to reading the cell broadcast channel (CBCH) at least once every 1.88 seconds (8*51*4.615 milliseconds (ms)=1.88 seconds). Thus, a wireless communication device 104 may waste power reading the cell broadcast channel (CBCH) block, only to discover that the wireless communication device 104 does not need this block.

To overcome this issue, the 3GPP specification has a mechanism whereby the network sends a cell broadcast (CB) scheduling message on the cell broadcast channel (CBCH). One cell broadcast (CB) message slot may include TC=0, 1, 2 and 3 (or TC=4, 5, 6 and 7 for cell broadcast channel (CBCH) extended). A cell broadcast (CB) scheduling message may take up one message slot. The cell broadcast (CB) scheduling message may describe what is to be transmitted in upcoming message slots (up to 48 upcoming message slots). The cell broadcast (CB) scheduling message may also describe to the wireless communication device 104 what will be transmitted in the upcoming cell broadcast (CB) message slots (e.g., a new message and its message ID 122, an old message and its message ID 122 or no message).

Based on this information, the wireless communication device 104 may determine which message slots need to be read. The terms 'old message' and 'new message' refer to whether what is being transmitted is different than (new) or the same as (old) the previous cell broadcast (CB) scheduling message. Each cell broadcast (CB) scheduling message may only give information for up to 48 message slots. After this period, the wireless communication device 104 may either receive a new cell broadcast (CB) scheduling message or, if the wireless communication device 104 does not receive a new cell broadcast (CB) scheduling message, the wireless communication device 104 may start to read the cell broadcast channel (CBCH) every time TC=0 occurs.

However, real networks do not normally send cell broadcast (CB) scheduling messages. Thus, wireless communication devices 104 cannot take advantage of this feature. To overcome the deficiencies associated with a wireless communication device 104 reading the cell broadcast channel (CBCH) at least every 1.88 seconds, the methods of FIG. 5 and FIG. 6 are introduced.

Figure 5:
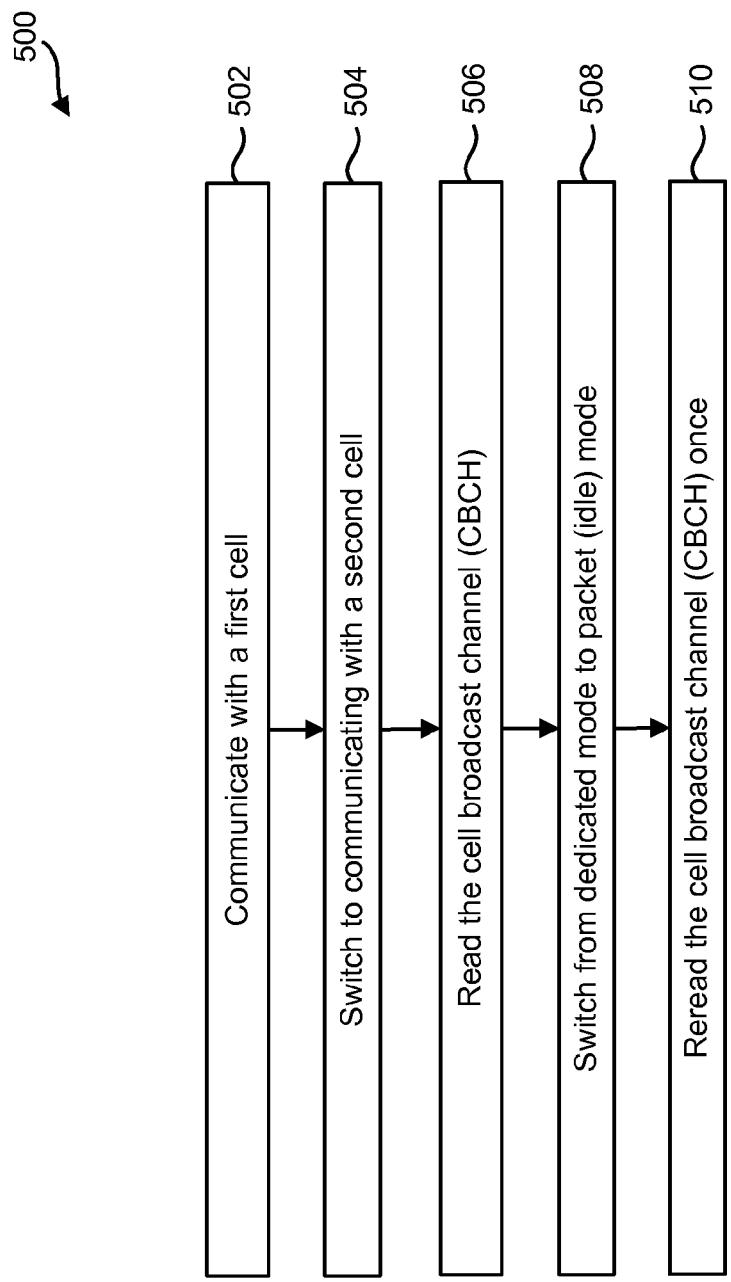
FIG. 5 is a flow diagram of a method for optimizing the reception of cell broadcast (CB) messages according to some embodiments of the present invention.
Figure 6:
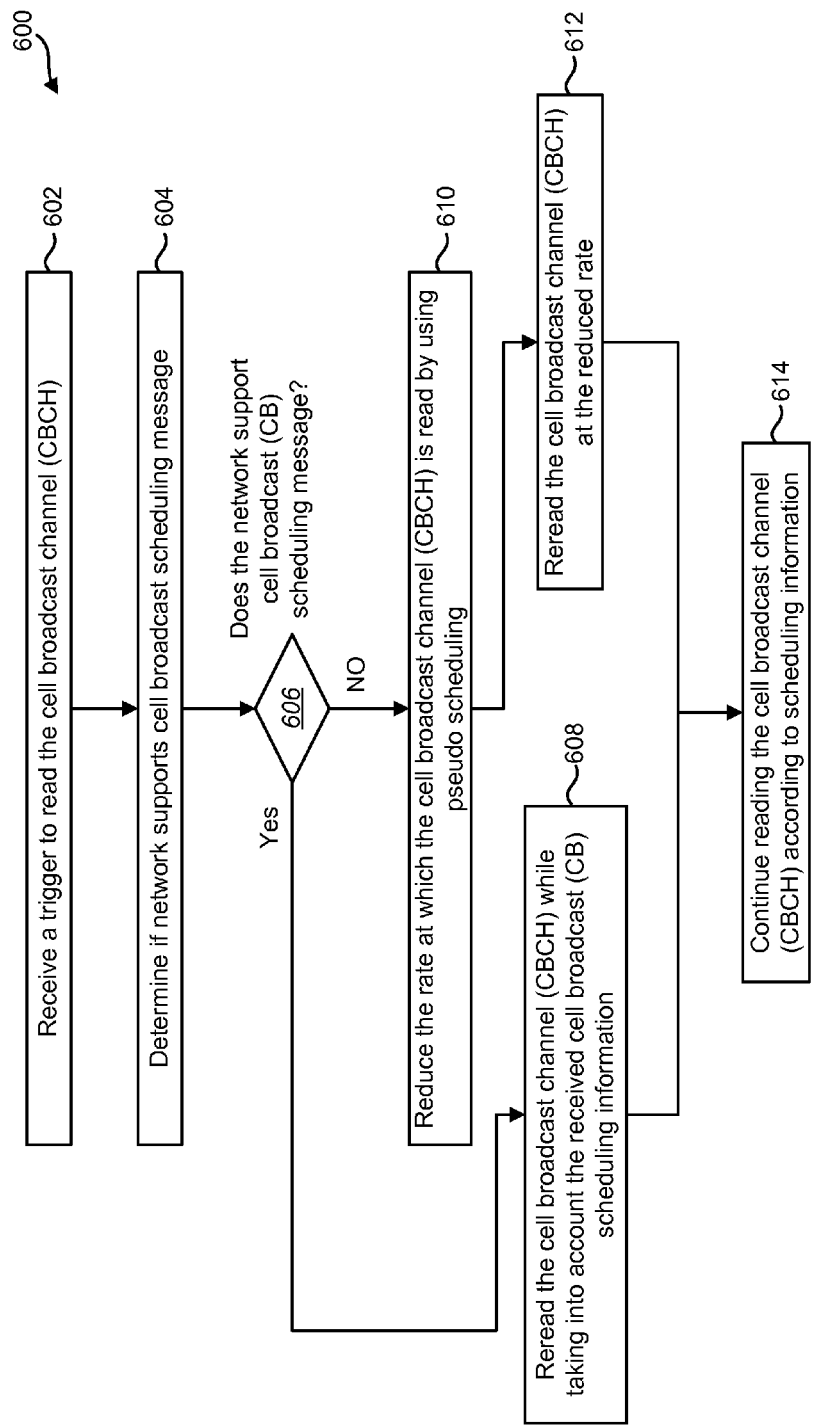
FIG. 6 is a flow diagram of another method for optimizing the reception of cell broadcast (CB) messages according to some embodiments of the present invention.

FIG. 5 is a flow diagram of a method 500 for optimizing the reception of cell broadcast (CB) messages 436. The method 500 may be performed by a wireless communication device 104. The method 500 may be performed by single-SIM wireless communication devices 104 and dual-SIM wireless communication devices 104. Thus, the wireless communication device 104 may have a first subscription and a second subscription. The wireless communication device 104 may communicate 502 with a first cell using the first subscription. The wireless communication device 104 may then switch 504 to communicating with a second cell.

In the method 500 shown, the wireless communication device 104 may read 506 the cell broadcast channel (CBCH) upon a cell change. Reading 506 the cell broadcast channel (CBCH) may refer to searching for cell broadcast (CB) messages 436 on the cell broadcast channel (CBCH). The wireless communication device 104 may switch 508 from dedicated mode to packet (idle) mode. In embodiments of the present invention, the wireless communication device 104 may then reread 510 the cell broadcast channel (CBCH) once. This way, the wireless communication device 104 does not need to keep rereading the cell broadcast channel (CBCH) every 1.88 seconds. The wireless communication device 104 may refresh the cell broadcast (CB) message 436 every time the wireless communication device 104 leaves dedicated mode after performing an action (e.g., a location update, a voice call, etc.). The wireless communication device 104 does not need to reread the cell broadcast channel (CBCH) upon entering (packet) idle mode from packet transfer mode, as transitions between these two states may happen frequently.

The method 500 may be suitable when cell broadcast (CB) messages 436 do not change very often. The customer may enable or disable this method 500. However, the method 500 illustrated in FIG. 5 should be disabled automatically if it is determined that a cell broadcast (CB) scheduling message is supported in the cell. Thus, upon cell selection or reselection, the wireless communication device 104 needs to determine if cell broadcast (CB) scheduling message is supported in the cell. This may be accomplished by reading at least 49 consecutive message slots (which takes approximately 92 seconds (49*8*51*4.615=92)).

Furthermore, the method 500 of FIG. 5 has a drawback in that if the network changes the cell broadcast (CB) message(s) 436, the wireless communication device 104 will not detect this change until the wireless communication device 104 either performs cell reselection or enters dedicated mode and then returns to packet (idle) mode.

FIG. 6 is a flow diagram of another method 600 for optimizing the reception of cell broadcast (CB) messages 436. The method 600 may be performed by a wireless communication device 104. The method 600 may be performed by single-SIM wireless communication devices 104 and dual-SIM wireless communication devices 104. The wireless communication device 104 may receive 602 a trigger to read the cell broadcast channel (CBCH). One trigger to read the cell broadcast channel (CBCH) is the wireless communication device 104 switching from one cell to another cell. Another trigger to read the cell broadcast channel (CBCH) is the wireless communication device 104 entering (packet) idle mode from dedicated mode.

The wireless communication device 104 may determine 604 whether the network supports cell broadcast (CB) scheduling message. As discussed above in relation to FIG. 5, the wireless communication device 104 may determine 606 whether the network supports cell broadcast (CB) scheduling message by monitoring the cell broadcast channel (CBCH) for 49 consecutive cell broadcast (CB) message slots (approximately 92 seconds) after entering packet idle mode in a cell. If no cell broadcast (CB) scheduling message is received during this period, then the wireless communication device 104 assumes the network does not support cell broadcast (CB) scheduling message.

If the network supports cell broadcast (CB) scheduling message, the wireless communication device 104 may reread 608 the cell broadcast channel (CBCH) while taking into account the received cell broadcast (CB) scheduling information. The wireless communication device 104 may then continue 614 reading the cell broadcast channel (CBCH) according to scheduling information.

If the network does not support cell broadcast (CB) scheduling message, the wireless communication device 104 may reduce 610 the rate at which the cell broadcast channel (CBCH) is read by using pseudo scheduling. In other words, if the network does not support cell broadcast (CB) scheduling message, the wireless communication device 104 may read the cell broadcast channel (CBCH) at a lower rate than every 1.88 seconds. For example, the wireless communication device 104 may skip four message slots after the last message slot read (and thus not read the cell broadcast channel (CBCH) for approximately 10 seconds). The wireless communication device 104 may then reread 612 the cell broadcast channel (CBCH) at the reduced rate. Rereading 612 the cell broadcast channel (CBCH) at the reduced rate may be referred to as pseudo scheduling. Pseudo scheduling is discussed in additional detail below in relation to FIG. 7 and FIG. 8. The wireless communication device 104 may then continue 614 reading the cell broadcast channel (CBCH) according to scheduling information.

One reason pseudo scheduling is able to be used is that cell broadcast (CB) messages 436 do not change very often. In general, each cell broadcast (CB) message 436 does not change every 1.88 seconds. Also, there are no strict performance requirements for cell broadcast (CB) message 436 reception. Using pseudo scheduling may reduce power consumption in both single-SIM and dual-SIM wireless communication devices 104. It may also reduce the instances of cell broadcast channel (CBCH) read for one subscription colliding with paging channel (PCH) read of the other subscription. However, pseudo scheduling may fail to read a cell broadcast (CB) message 436, since pseudo scheduling uses a non-intelligent cell broadcast channel (CBCH) read rate.

In embodiments of the present invention, pseudo scheduling reuses the same functionality in the wireless communication device 104 that is designed for real cell broadcast (CB) scheduling. The pseudo scheduling mechanism is flexible as it allows for different patterns for reading the cell broadcast channel (CBCH). For dual-SIM cases, pseudo scheduling may reduce the opportunity of collisions of page channel (PCH) reading on one subscription and cell broadcast channel (CBCH) reading on the other subscription.

The method 600 of FIG. 6 may have a lower standby time than the method 500 of FIG. 5. The method 600 of FIG. 6 may also increase the power consumption of the wireless communication device 104 compared to the method 500 of FIG. 5. However, the method 600 of FIG. 6 has the advantage of the wireless communication device 104 being able to refresh the cell broadcast (CB) messages 436 quicker than the method 500 of FIG. 5. The method 600 of FIG. 6 may be enabled or disabled by the customer. The method 600 of FIG. 6 may be implemented by generating pseudo schedule information.

Figure 7:
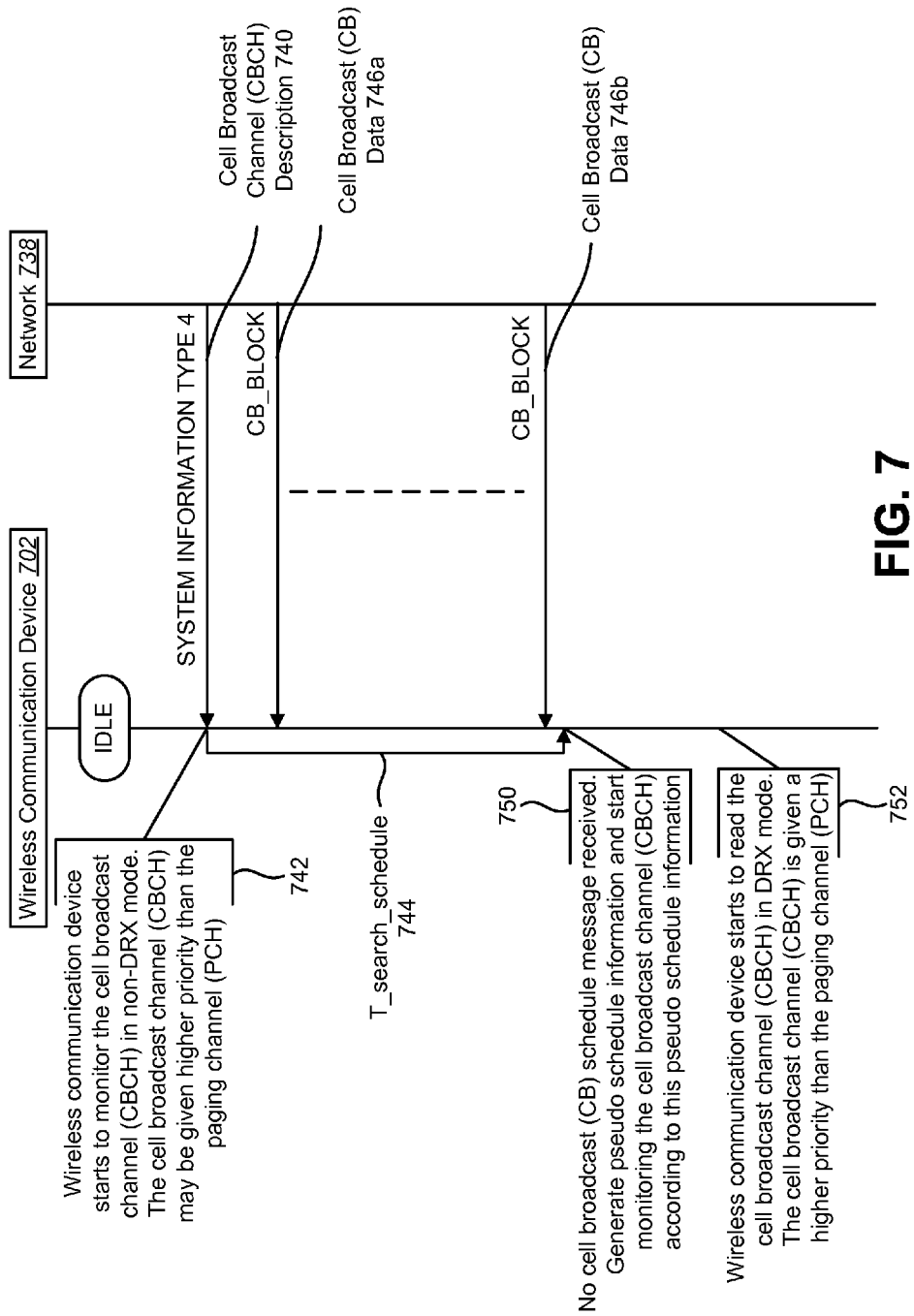
FIG. 7 illustrates data flows between a wireless communication device and a network, where pseudo scheduling is implemented after determining that the network has not sent a cell broadcast scheduling message according to some embodiments of the present invention.

FIG. 7 illustrates data flows between a wireless communication device 702 and a network 738, where pseudo scheduling is implemented after determining that the network 738 has not sent a cell broadcast (CB) scheduling message. Upon receiving a cell broadcast channel (CBCH) description 740 from the network 738, a wireless communication device 702 may start to monitor 742 the cell broadcast channel (CBCH) in non-DRX mode (i.e., the wireless communication device 702 starts to read every radio block on the cell broadcast channel (CBCH) whenever TC=0). During this period (referred to as T_search_schedule 744 and controlled by a timer), the wireless communication device 702 is searching for the cell broadcast (CB) scheduling messages as well as for the desired cell broadcast (CB) message(s) 436 from cell broadcast (CB) data (CB_BLOCK) 746a-b broadcast on the cell broadcast channel (CBCH).

Once the search for cell broadcast (CB) scheduling message is finished (i.e., after 49 consecutive cell broadcast (CB) message slots), if no cell broadcast (CB) scheduling message was received, the wireless communication device 702 may generate 750 its own scheduling information (i.e., pseudo scheduling information) and start to read 752 the cell broadcast channel (CBCH) according to this scheduling information. The cell broadcast channel (CBCH) is given a higher priority than the paging channel (PCH).

In one configuration, the pseudo schedule information may be that of Table 3 below.

TABLE 3

| | | | | | | | |
|---|---|---|---|---|---|---|---|
| NM 1 = 0 | NM 2 = 1 | NM 3 = 0 | NM 4 = 0 | NM 5 = 0 | NM 6 = 0 | NM 7 = 1 | NM 8 = 0 |
| NM 9 = 0 | NM 10 = 0 | NM 11 = 0 | NM 12 = 1 | NM 13 = 0 | NM 14 = 0 | NM 15 = 0 | NM 16 = 0 |
| NM 17 = 1 | NM 18 = 0 | NM 19 = 0 | NM 20 = 0 | NM 21 = 0 | NM 22 = 1 | NM 23 = 0 | NM 24 = 0 |
| NM 25 = 0 | NM 26 = 0 | NM 27 = 1 | NM 28 = 0 | NM 29 = 0 | NM 30 = 0 | NM 31 = 0 | NM 32 = 1 |
| NM 33 = 0 | NM 34 = 0 | NM 35 = 0 | NM 36 = 0 | NM 37 = 1 | NM 38 = 0 | NM 39 = 0 | NM 40 = 0 |
| NM 41 = 0 | NM 42 = 1 | NM 43 = 0 | NM 44 = 0 | NM 45 = 0 | NM 46 = 0 | NM 47 = 1 | NM 48 = 0 |

In the pseudo schedule information of Table 3, the wireless communication device 702 may read every $5^{th}$ message (~9.4 second period) during a pseudo schedule period, thus reducing the rate for the cell broadcast channel (CBCH) read. Thus, the wireless communication device 702 may read the NM 2 message, the NM 7 message, etc. Consecutive schedules may shift the pseudo schedule period. This may give the wireless communication device 702 the opportunity to read other cell broadcast (CB) message slots, in case multiple cell broadcast (CB) messages 436 broadcast cyclically.

Figure 8:
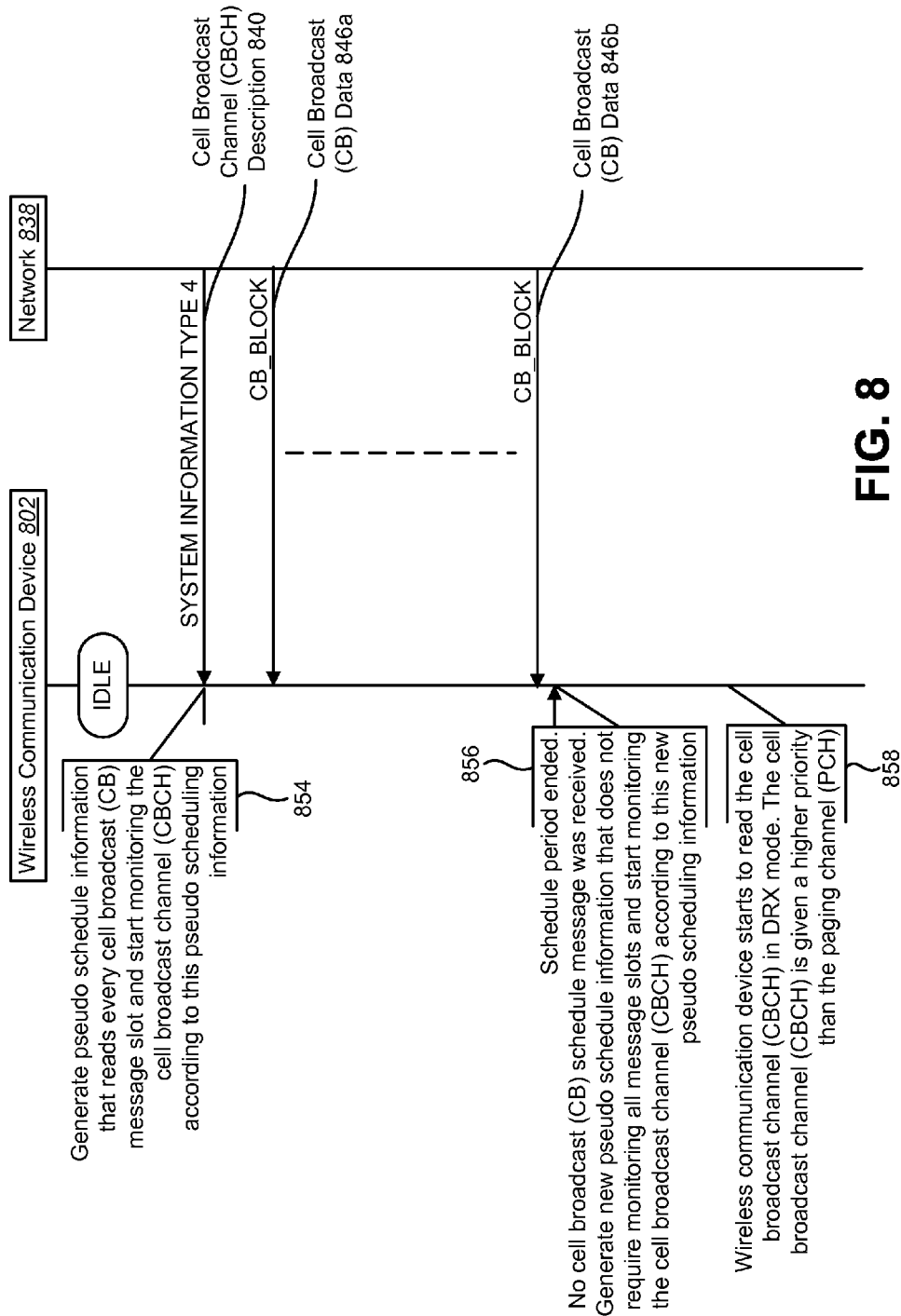
FIG. 8 illustrates data flows between a wireless communication device and the network, where pseudo scheduling is renewed periodically according to some embodiments of the present invention.

FIG. 8 illustrates data flows between a wireless communication device 802 and the network 838, where pseudo scheduling is renewed periodically. The wireless communication device 802 may generate 854 pseudo schedule information that reads every cell broadcast (CB) message slot upon receiving a cell broadcast channel (CBCH) description 840 from the network 838. The wireless communication device 802 may then start monitoring the cell broadcast channel (CBCH) according to this pseudo scheduling information.

During the schedule period, the wireless communication device 802 may search for a cell broadcast (CB) scheduling message from cell broadcast (CB) data (CB_BLOCK) 846a-b broadcast on the cell broadcast channel (CBCH) from the network 838. If a cell broadcast (CB) scheduling message is received from the network 838, the wireless communication device 802 may implement the scheduling according to the cell broadcast (CB) scheduling message.

If the schedule period ends and no cell broadcast (CB) schedule message was received, the wireless communication device 802 may generate 856 new pseudo schedule information that does not require monitoring all cell broadcast (CB) message slots. The wireless communication device 802 may then start monitoring 858 the cell broadcast channel (CBCH) according to the new pseudo scheduling information.

The wireless communication device may start to read the cell broadcast channel (CBCH) in discontinuous reception (DRX) mode. The cell broadcast channel (CBCH) may be given a higher priority than the paging channel (PCH).

Figure 9:
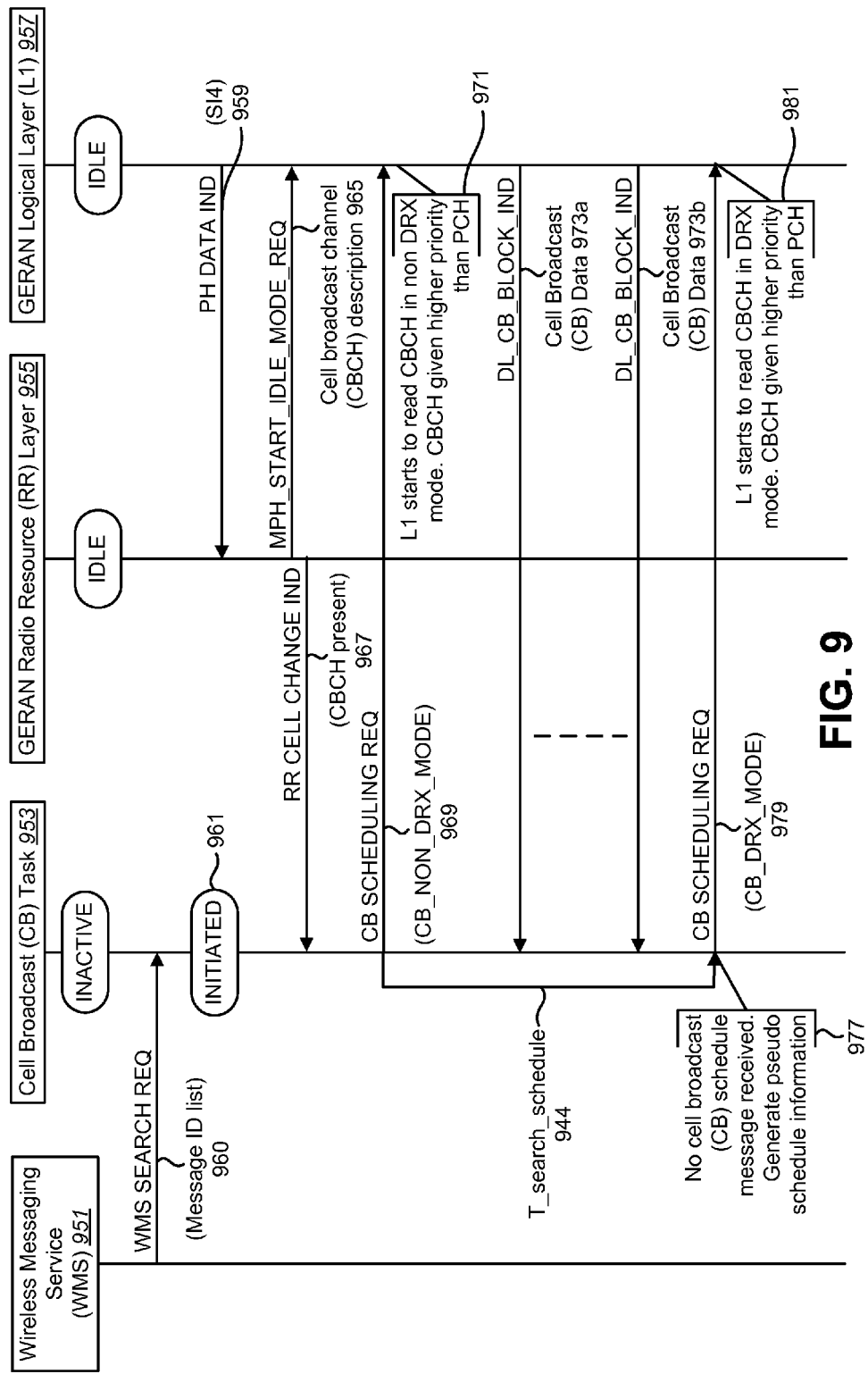
FIG. 9 illustrates data flows on a wireless communication device that implements pseudo scheduling according to some embodiments of the present invention.

FIG. 9 illustrates data flows on a wireless communication device 104 that implements pseudo scheduling. In FIG. 9, an explicit timer T_search_schedule 944 is used on the wireless communication device 104. The wireless communication device 104 may include a wireless messaging service (WMS) 951, a cell broadcast (CB) task 953, a GERAN radio resource (RR) layer 955 and a GERAN logical layer (L1) 957. The wireless messaging service (WMS) 951 may send a WMS search request (Message ID list 960) to the cell broadcast (CB) task 953. The cell broadcast (CB) task 953 may then be initiated 961. The GERAN logical layer (L1) 957 may send a PH DATA IND (SI4) 959 to the GERAN radio resource (RR) layer 955. The GERAN radio resource (RR) layer 955 may respond by sending a MPH_START_IDLEMODEREQ (CBCH description 965) to the GERAN logical layer (L1) 957. The GERAN radio resource (RR) layer 955 may also send a RR CELL CHANGE IND (CBCH present 967) to the cell broadcast (CB) task 953.

The wireless communication device 104 may then begin a search to determine if cell broadcast (CB) scheduling is supported by the cell (referred to as T_search_schedule 944). The cell broadcast (CB) task 953 may send a cell broadcast (CB) scheduling request 969 (CB_NON_DRX_MODE) to the GERAN logical layer (L1) 957. The GERAN logical layer (L1) 957 may start to read 971 the cell broadcast channel (CBCH) in non-DRX mode. The cell broadcast channel (CBCH) may be given higher priority than the paging channel (PCH). The GERAN logical layer (L1) 957 may then send multiple DL_CB_BLOCK_IND (cell broadcast (CB) data 973a-b) to the cell broadcast (CB) task 953. The DL_B-C_BLOCK_IND may indicate the reception of one block over the cell broadcast channel (CBCH). This block may include an actual cell broadcast (CB) message 436, an empty block (i.e., the network sent a filler frame) or a cell broadcast (CB) scheduling message.

Once the search for a cell broadcast (CB) scheduling message is finished (i.e., after 49 consecutive cell broadcast (CB) message slots), if no cell broadcast (CB) scheduling message was received, the cell broadcast (CB) task 953 may send a cell broadcast (CB) scheduling request 979 (CB_DRX_MODE) to the GERAN logical layer (L1) 957. The GERAN logical layer (L1) 957 may start to read 981 the cell broadcast channel (CBCH) in discontinuous reception (DRX) mode. The cell broadcast channel (CBCH) is given a higher priority than the paging channel (PCH). The cell broadcast (CB) task 953 may then generate 977 pseudo schedule information and read the cell broadcast channel (CBCH) according to the generated pseudo scheduling information.

If a cell broadcast (CB) schedule message is received during the T_search_schedule 944, the cell broadcast (CB) task 953 may configure the GERAN logical layer (L1) 957 with the received cell broadcast (CB) schedule message.

Figure 10:
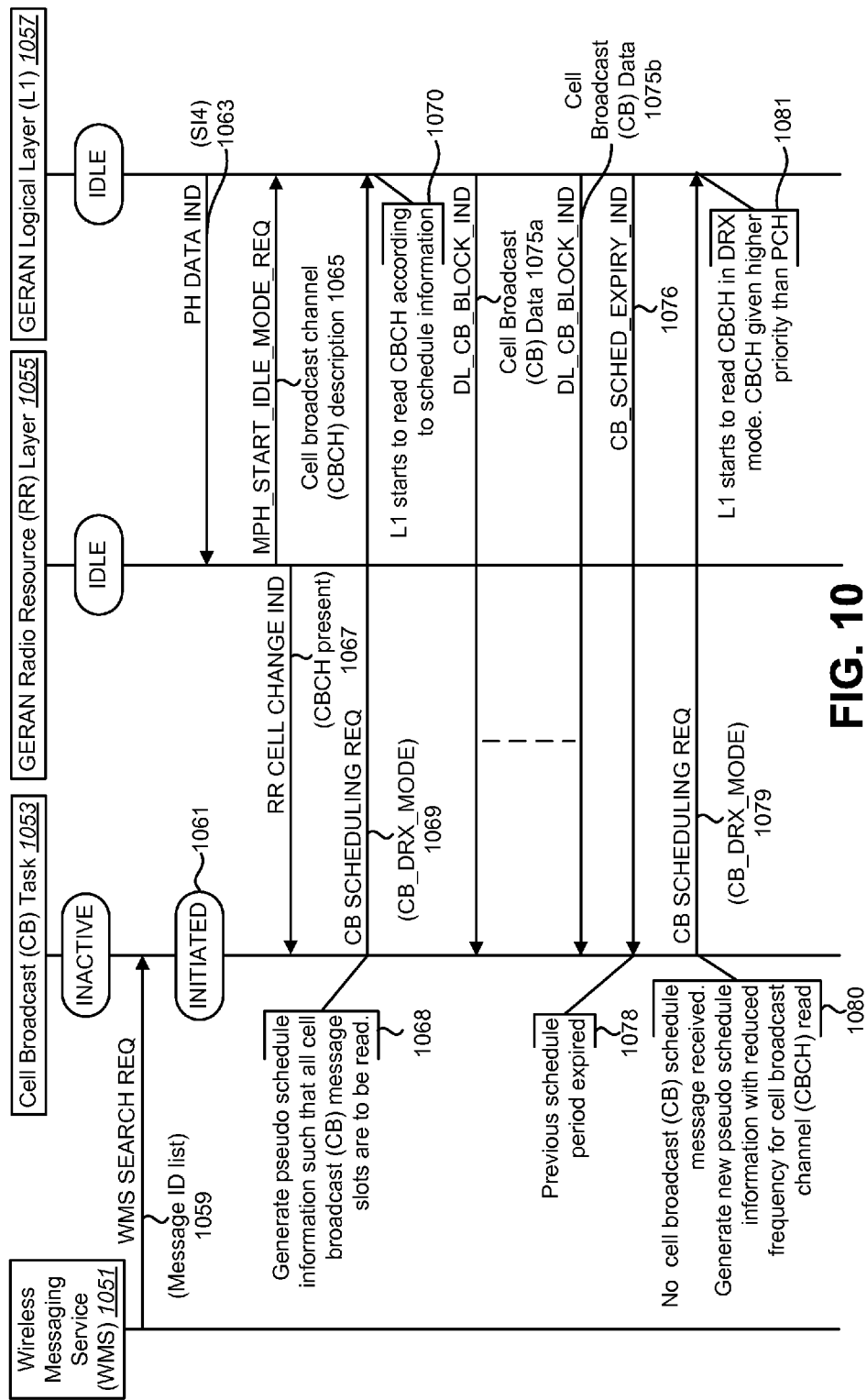
FIG. 10 also illustrates data flows on a wireless communication device that implements pseudo scheduling according to some embodiments of the present invention.

FIG. 10 also illustrates data flows on a wireless communication device 104 that implements pseudo scheduling. In FIG. 10, no explicit timer is used on the wireless communication device 104. The wireless communication device 104 may include a wireless messaging service (WMS) 1051, a cell broadcast (CB) task 1053, a GERAN radio resource (RR) layer 1055 and a GERAN logical layer (L1) 1057. The wireless messaging service (WMS) 1051 may send a WMS search request (Message ID list 1059) to the cell broadcast (CB) task 1053. The cell broadcast (CB) task 1053 may be initiated 1061. The GERAN logical layer (L1) 1057 may send a PH DATA IND (SI4 1063) to the GERAN radio resource (RR) layer 1055. The GERAN radio resource (RR) layer 1055 may respond by sending a MPH_START_IDLE_MODE_REQ (CBCH description 1065) to the GERAN logical layer (L1) 1057. The GERAN radio resource (RR) layer 1055 may also send a RR CELL CHANGE IND (CBCH present 1067) to the cell broadcast (CB) task 1053.

The cell broadcast (CB) task 1053 may generate 1068 pseudo schedule information such that all cell broadcast (CB) message slots are to be read. The cell broadcast (CB) task 1053 may send a cell broadcast scheduling request (CB_DRX_MODE 1069) to the GERAN logical layer (L1) 1057. The GERAN logical layer (L1) 1057 may start to read 1070 the cell broadcast channel (CBCH) according to the pseudo schedule information. The GERAN logical layer (L1) 1057 may send multiple DL_CB_BLOCK_IND (CB data 1075a-b) to the cell broadcast (CB) task 1053 during the schedule period indicating if a cell broadcast (CB) schedule message or a cell broadcast (CB) message 436 is received.

If no cell broadcast (CB) schedule message was received and no cell broadcast (CB) message 436 was received and the previous schedule period expires 1078 (i.e., the GERAN logical layer (L1) 1057 sends a CB_SCHED_EXPIRY_IND 1076 to the cell broadcast (CB) task 1053, the cell broadcast (CB) task 1053 may generate 1080 new pseudo schedule information with reduced frequency for cell broadcast channel (CBCH) read. The cell broadcast (CB) task 1053 may send a cell broadcast (CB) scheduling request (CB_DRX_MODE 1079) to the GERAN logical layer (L1) 1057. The GERAN logical layer (L1) 1057 may then start to read 1081 the cell broadcast channel (CBCH) in discontinuous reception (DRX) mode. The cell broadcast channel (CBCH) is given a higher priority than the paging channel (PCH).

Figure 11:
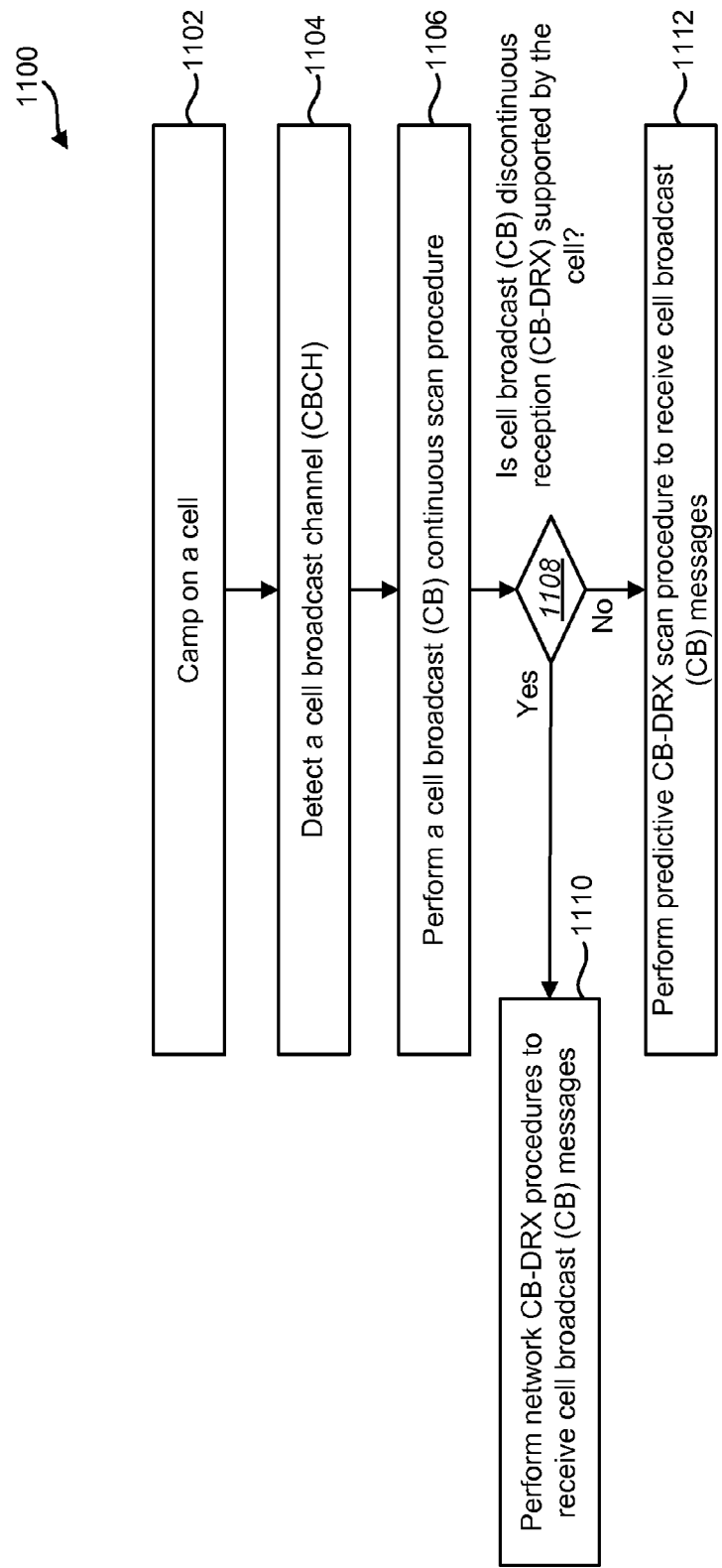
FIG. 11 is a flow diagram of a method for receiving cell broadcast (CB) messages according to some embodiments of the present invention.

FIG. 11 is a flow diagram of a method 1100 for receiving cell broadcast (CB) messages 436. The method 1100 may be performed by a wireless communication device 104. The wireless communication device 104 may camp 1102 on a cell. The wireless communication device 104 may detect 1104 a cell broadcast channel (CBCH). The cell broadcast channel (CBCH) may be a downlink channel used to broadcast cell broadcast (CB) messages to all subscribers within a cell. The wireless communication device 104 may perform 1106 a cell broadcast (CB) continuous scan procedure in embodiments of the present invention. In one configuration, the wireless communication device 104 may monitor the cell broadcast channel (CBCH) using the cell broadcast (CB) continuous scan procedure.

The wireless communication device 104 may then determine 1108 whether cell broadcast (CB) discontinuous reception (CB-DRX) is supported by the cell. If CB-DRX is supported by the cell, the wireless communication device 104 may perform 1110 network CB-DRX procedures to receive cell broadcast (CB) messages 436. If CB-DRX is not supported by the cell, the wireless communication device 104 may perform 1112 a predictive CB-DRX scan procedure to receive cell broadcast (CB) messages 436. The possible outcomes of the predictive CB-DRX scan procedure include a continuous scan being performed on every new message detection/failure of the predictive CB-DRX scan procedure, a next predictive CB-DRX scan procedure to wake up with the periodicity of each unique message or a CB-DRX mode if a schedule message is found.

Figure 12:
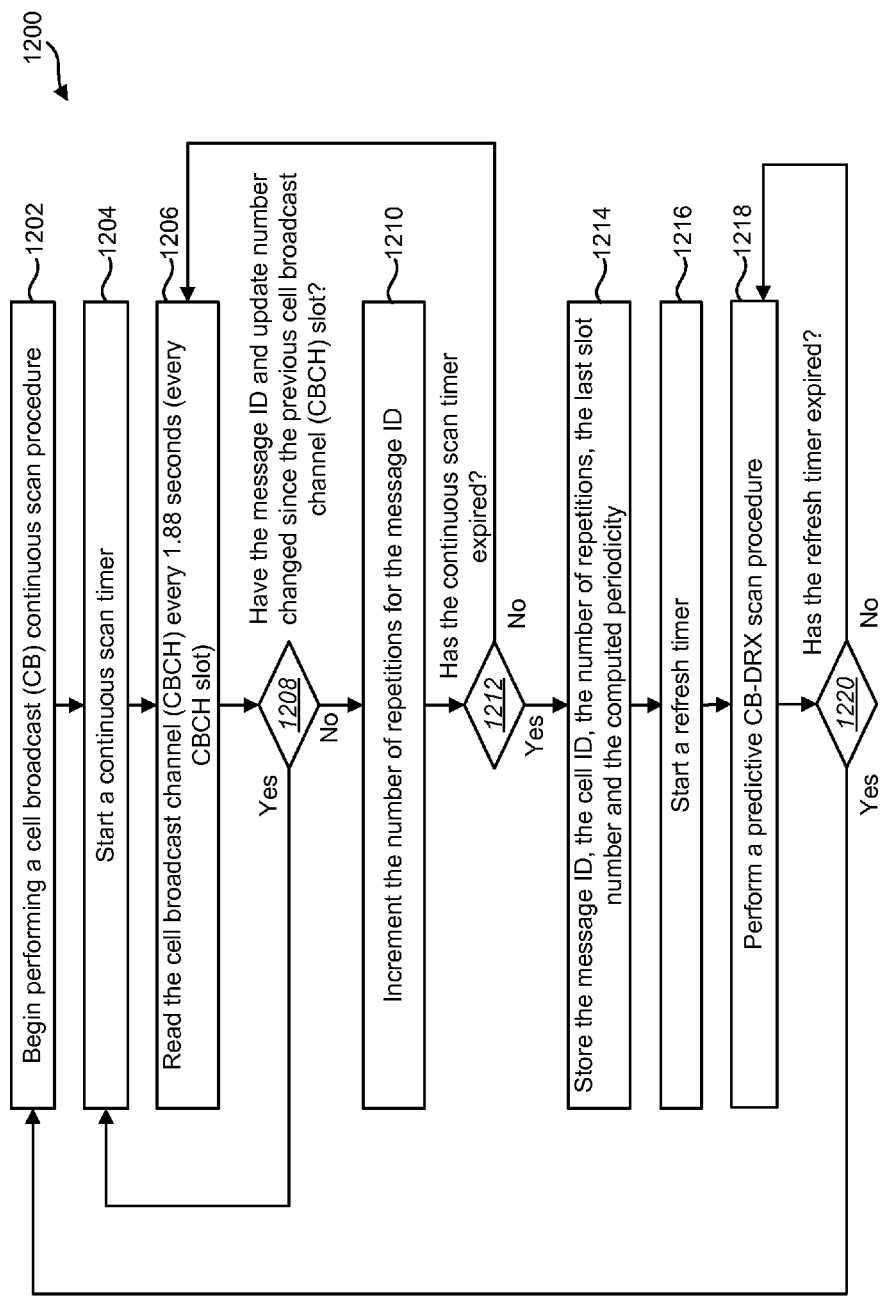
FIG. 12 is a flow diagram of a method for receiving cell broadcast (CB) messages using a cell broadcast (CB) continuous scan procedure according to some embodiments of the present invention.

FIG. 12 is a flow diagram of a method 1200 for receiving cell broadcast (CB) messages 436 using a cell broadcast (CB) continuous scan procedure. The method 1200 may be performed by a wireless communication device 104. The wireless communication device 104 may begin performing 1202 a cell broadcast (CB) continuous scan procedure. The wireless communication device 104 may start 1204 a continuous scan timer 118. The wireless communication device 104 may read 1206 the cell broadcast channel (CBCH) every 1.88 seconds (every cell broadcast channel (CBCH) slot).

The wireless communication device 104 may determine 1208 whether the message ID 122 and update number 129 have changed since the previous cell broadcast channel (CBCH) slot. If the message ID 122 or update number 129 has changed since the previous cell broadcast channel (CBCH) slot, the wireless communication device 104 may restart 1204 the continuous scan timer 118. If the message ID 122 and update number 129 have not changed since the previous cell broadcast channel (CBCH) slot, the wireless communication device 104 may increment 1210 the number of repetitions 120 for the message ID 122. The wireless communication device 104 may determine 1212 whether the continuous scan timer 118 has expired. If the continuous scan timer 118 has not expired, the wireless communication device 104 may return to reading 1206 the cell broadcast channel (CBCH) every 1.88 seconds.

If the continuous scan timer 118 has expired, the wireless communication device 104 may store 1214 the message ID 122, the cell ID 124, the number of repetitions 120, the last slot number 126 and the computed periodicity 128 in memory. The wireless communication device 104 may start 1216 a refresh timer 116. The wireless communication device 104 may perform 1218 a predictive CB-DRX scan procedure. The wireless communication device 104 may determine 1220 whether the refresh timer 116 has expired. If the refresh timer 116 has not expired, the wireless communication device 104 may continue to perform 1218 the predictive CB-DRX scan procedure. If the refresh timer 116 has expired, the wireless communication device 104 may begin 1202 performing a cell broadcast (CB) continuous scan procedure.

Figure 13:
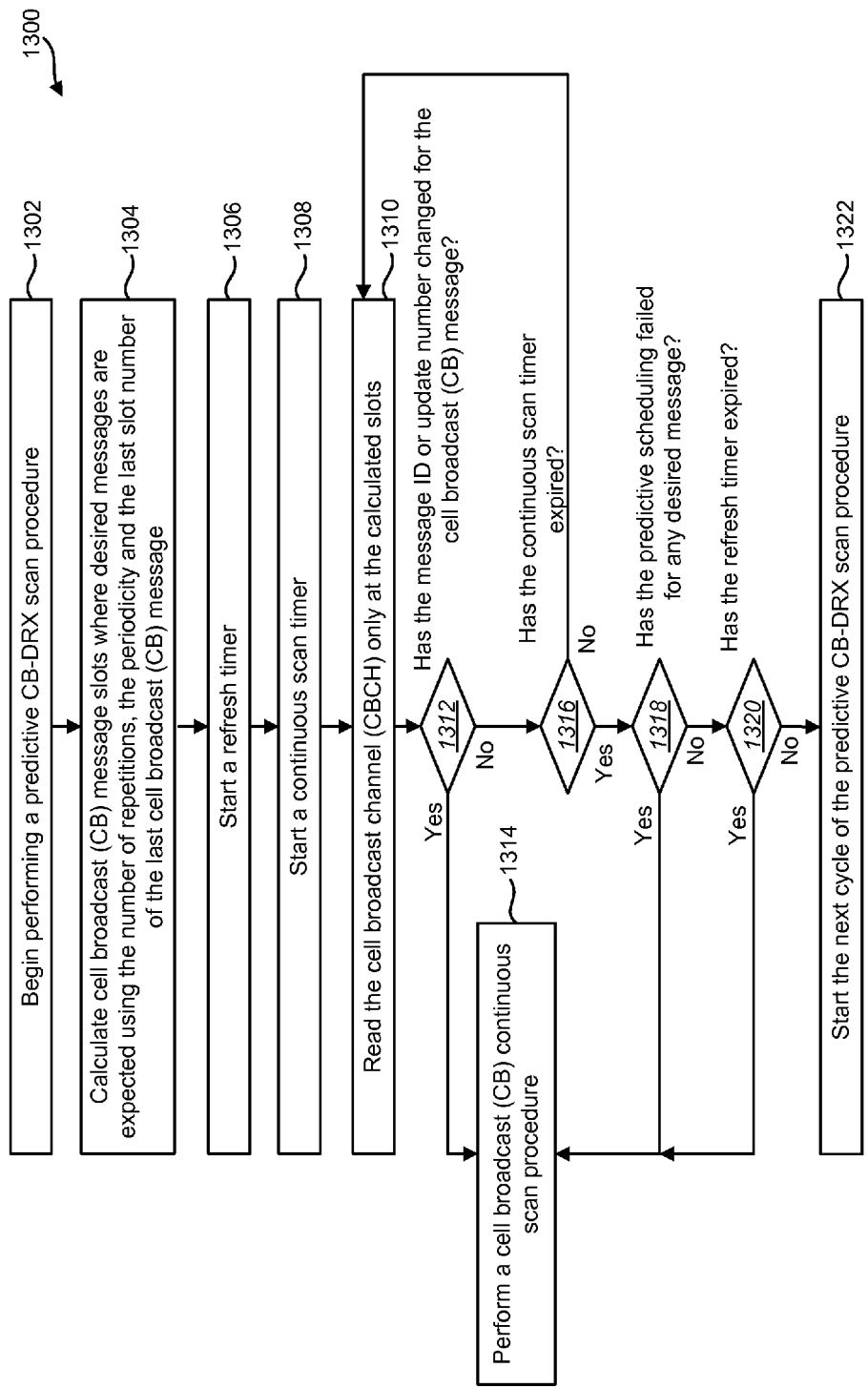
FIG. 13 is flow diagram of a method for performing a predictive cell broadcast discontinuous reception (CB-DRX) scan procedure according to some embodiments of the present invention.

FIG. 13 is flow diagram of a method 1300 for performing a predictive cell broadcast discontinuous reception (CB-DRX) scan procedure. The method 1300 may be performed by a wireless communication device 104. The wireless communication device 104 may begin 1302 performing a predictive CB-DRX scan procedure. In embodiments of the present invention, the wireless communication device 104 may calculate 1304 cell broadcast (CB) message slots where desired cell broadcast (CB) messages 436 are expected using the number of repetitions 120, the periodicity 128, and the last slot number 126 of the last cell broadcast (CB) message 436. As discussed above, the cell broadcast (CB) message slot in which a cell broadcast (CB) message 436 is broadcast by a network does not usually change frequently. Thus, by observing when a desired cell broadcast (CB) message 436 is broadcast by a network, the wireless communication device 104 may determine a cell broadcast (CB) message slot where a desired cell broadcast (CB) message 436 is most likely to be broadcast.

The wireless communication device 104 may start 1306 a refresh timer 116. The wireless communication device 104 may also start 1308 a continuous scan timer 118. The refresh timer 116 may be used to periodically move back to the cell broadcast (CB) continuous scan procedure. The continuous scan timer 118 may be used to measure 49 cell broadcast channel (CBCH) slots (which is a single cycle of predictive DRX mode). The wireless communication device 104 may read 1310 the cell broadcast channel (CBCH) only at the calculated slots.

The wireless communication device 104 may determine 1312 whether the message ID 122 or update number 129 for the cell broadcast (CB) message 436 has changed. If the message ID 122 or update number 129 has changed for the cell broadcast (CB) message 436, the wireless communication device 104 may perform 1314 a cell broadcast (CB) continuous scan procedure. If the message ID 122 and update number 129 of the cell broadcast (CB) message 436 have not changed, the wireless communication device 104 may determine 1316 whether the continuous scan timer 118 has expired. If the continuous scan timer 118 has not expired, the wireless communication device 104 may continue to read 1310 the cell broadcast channel (CBCH) only at the calculated slots. If the continuous scan timer 118 has expired, the wireless communication device 104 may determine 1318 whether predictive scheduling has failed for any desired message.

If predictive scheduling has failed for any desired message, the wireless communication device 104 may perform 1314 a cell broadcast (CB) continuous scan procedure. If predictive scheduling has not failed for any desired message, the wireless communication device 104 may determine 1320 whether the refresh timer 116 has expired. If the refresh timer 116 has expired, the wireless communication device 104 may perform 1314 a cell broadcast (CB) continuous scan procedure. If the refresh timer 116 has not expired, the wireless communication device 104 may start 1322 the next cycle of the predictive CB-DRX scan procedure.

Figure 14:
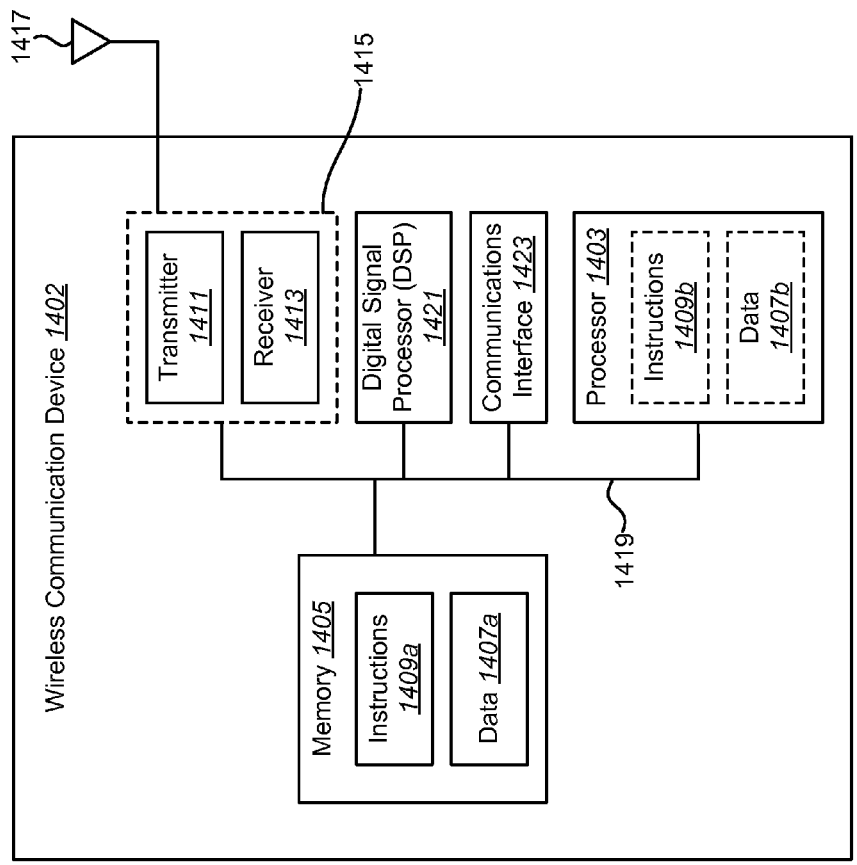
FIG. 14 illustrates certain components that may be included within a wireless communication device according to some embodiments of the present invention.

FIG. 14 illustrates certain components that may be included within a wireless communication device 1402. The wireless communication device 1402 may be an access terminal, a mobile station, a wireless communication device, etc. In addition, the wireless communication device can be, for example, wireless communication device 104 shown in FIG. 1.

In general, the wireless communication device 1402 can comprise a number of components. The wireless communication device 1402 includes a processor 1403. The processor 1403 may be a general purpose single- or multi-chip microprocessor (e.g., an ARM), a special purpose microprocessor (e.g., a digital signal processor (DSP)), a microcontroller, a programmable gate array, etc. The processor 1403 may be referred to as a central processing unit (CPU). Although just a single processor 1403 is shown in the wireless communication device 1402 of FIG. 14, in an alternative configuration, a combination of processors (e.g., an ARM and digital signal processor (DSP)) could be used.

The wireless communication device 1402 also includes memory 1405. The memory 1405 may be any electronic component capable of storing electronic information. The memory 1405 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 1407a and instructions 1409a may be stored in the memory 1405. The instructions 1409a may be executable by the processor 1403 to implement the methods disclosed herein. Executing the instructions 1409a may involve the use of the data 1407a that is stored in the memory 1405. When the processor 1403 executes the instructions 1409a, various portions of the instructions 1409b may be loaded onto the processor 1403, and various pieces of data 1407b may be loaded onto the processor 1403.

The wireless communication device 1402 may also include a transmitter 1411 and a receiver 1413 to allow transmission and reception of signals to and from the wireless communication device 1402. The transmitter 1411 and receiver 1413 may be collectively referred to as a transceiver 1415. An antenna 1417 may be electrically coupled to the transceiver 1415. The wireless communication device 1402 may also include (not shown) multiple transmitters, multiple receivers, multiple transceivers and/or multiple antennas.

The wireless communication device 1402 may include a digital signal processor (DSP) 1421. The wireless communication device 1402 may also include a communications interface 1423. The communications interface 1423 may allow a user to interact with the wireless communication device 1402.

The various components of the wireless communication device 1402 may be coupled together by one or more buses, which may include a power bus, a control signal bus, a status signal bus, a data bus, etc. For the sake of clarity, the various buses are illustrated in FIG. 14 as a bus system 1419.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 5, 6, 11, 12 and 13, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

We claim:

1. A method for receiving cell broadcast messages, comprising:
   communicating with a first cell;
   switching to communicating with a second cell;
   reading a cell broadcast channel after switching cells;
   switching from a dedicated mode to a packet idle mode; and
   rereading the cell broadcast channel once after switching from a dedicated mode to a packet idle mode.

2. The method of claim 1, wherein the method is performed by a wireless communication device.

3. The method of claim 2, wherein the wireless communication device uses one or more subscriber identification module cards.

4. The method of claim 1, wherein cell broadcast scheduling message is not supported by the second cell.

5. The method of claim 1, wherein reading a cell broadcast channel comprises searching the cell broadcast channel for a cell broadcast message.

6. An apparatus for receiving cell broadcast messages, comprising:
   a processor;
   memory in electronic communication with the processor; and
   instructions stored in the memory, the instructions being executable by the processor to:
      communicate with a first cell;
      switch to communicating with a second cell;
      read a cell broadcast channel after switching cells;
      switch from a dedicated mode to a packet idle mode; and
      reread the cell broadcast channel once after switching from a dedicated mode to a packet idle mode.

7. The apparatus of claim 6, wherein the apparatus is a wireless communication device.

8. The apparatus of claim 7, wherein the wireless communication device uses one or more subscriber identification module cards.

9. The apparatus of claim 6, wherein cell broadcast scheduling message is not supported by the second cell.

10. The apparatus of claim 6, wherein reading a cell broadcast channel comprises searching the cell broadcast channel for a cell broadcast message.

11. An apparatus configured for receiving cell broadcast messages, comprising:
    means for communicating with a first cell;
    means for switching to communicating with a second cell;
    means for reading a cell broadcast channel after switching cells;
    means for switching from a dedicated mode to a packet idle mode; and
    means for rereading the cell broadcast channel once after switching from a dedicated mode to a packet idle mode.

12. A computer-program product for a receiving cell broadcast messages, the computer-program product comprising a non-transitory computer-readable medium having instructions thereon, the instructions comprising:
    code for causing a wireless device to communicate with a first cell;
    code for causing the wireless device to switch to communicating with a second cell;
    code for causing the wireless device to read a cell broadcast channel after switching cells;
    code for causing the wireless device to switch from a dedicated mode to a packet idle mode; and
    code for causing the wireless device to reread the cell broadcast channel once after switching from a dedicated mode to a packet idle mode.

* * * * *